US007299500B1

(12) United States Patent
Klebe et al.

(10) Patent No.: US 7,299,500 B1
(45) Date of Patent: Nov. 20, 2007

(54) METHOD AND APPARATUS FOR SECURE DELIVERY AND RIGHTS MANAGEMENT OF DIGITAL CONTENT AT AN UNSECURE SITE

(75) Inventors: Skott C. Klebe, Lexington, MA (US); John Boyea, Alpharetta, GA (US)

(73) Assignee: Copyright Clearance Center, Inc., Danvers, MA (US)

( * ) Notice: Subject to any disclaimer, the term of this patent is extended or adjusted under 35 U.S.C. 154(b) by 845 days.

(21) Appl. No.: 10/621,705

(22) Filed: Jul. 17, 2003

(51) Int. Cl.
*H04L 29/00* (2006.01)

(52) U.S. Cl. ...................................... 726/26
(58) Field of Classification Search .................. 726/21
See application file for complete search history.

(56) References Cited

U.S. PATENT DOCUMENTS

| | | | |
|---|---|---|---|
| 5,742,807 A * | 4/1998 | Masinter | 707/1 |
| 5,892,900 A | 4/1999 | Ginter et al. | |
| 5,949,876 A | 9/1999 | Ginter et al. | |
| 5,982,891 A | 11/1999 | Ginter et al. | |
| 6,112,181 A | 8/2000 | Shear et al. | |
| 6,138,119 A | 10/2000 | Hall et al. | |
| 6,157,721 A | 12/2000 | Shear et al. | |
| 6,253,193 B1 | 6/2001 | Ginter et al. | |
| 6,289,452 B1 * | 9/2001 | Arnold et al. | 713/175 |
| 6,292,569 B1 | 9/2001 | Shear et al. | |
| 6,363,488 B1 | 3/2002 | Ginter et al. | |
| 6,449,721 B1 * | 9/2002 | Pensak et al. | 713/171 |
| 6,711,594 B2 * | 3/2004 | Yano et al. | 707/204 |
| 6,807,632 B1 * | 10/2004 | Carpentier et al. | 713/165 |
| 7,017,188 B1 * | 3/2006 | Schmeidler et al. | 726/26 |
| 7,035,826 B2 * | 4/2006 | Hamada et al. | 705/51 |
| 7,073,199 B1 * | 7/2006 | Raley | 726/26 |
| 2002/0002541 A1 * | 1/2002 | Williams | 705/51 |

\* cited by examiner

*Primary Examiner*—Matthew B Smithers
(74) *Attorney, Agent, or Firm*—The Law Offices of Paul E. Kudirka

(57) ABSTRACT

At a publisher location, multiple encrypted documents are assembled into a distribution archive that is also encrypted. The distribution archive is then downloaded into a content server at an unsecure site. When the content server receives the distribution archive, it decrypts the archive file and unpacks the encrypted documents, which are then stored, in encrypted form, in a local document database. When a user logs into the local content server, a secure content viewer is downloaded to the user's browser. The content viewer requests a selected document from the local server, which then forwards the encrypted document to the viewer. The viewer then computes a document identifier from the encrypted document content and requests a key from the server with the identifier. The server then returns the requested key and the viewer decrypts that document and presents it in a display area controlled by the viewer.

30 Claims, 27 Drawing Sheets

METHOD AND APPARATUS FOR SECURE DELIVERY AND RIGHTS MANAGEMENT OF DIGITAL CONTENT AT AN UNSECURE SITE

FIELD OF THE INVENTION

This invention relates to electronic commerce and to methods and apparatus for distributing secure digital content to an unsecure site.

BACKGROUND OF THE INVENTION

Global distribution systems, such as the Internet, are increasingly being used for distribution of digital content that includes text and graphic information encoded in a variety of formats. However, copyright holders and publishers of such digital content have been slow to embrace the use of the Internet for distribution of digital content because it has been difficult to control unauthorized copying and dissemination of the content once it has been delivered onto the Internet. In particular, once content has been placed in digital form and delivered to a user, it can easily be copied, printed or forwarded to other users.

Thus, providers of digital content desire to establish a secure, global distribution system for digital content that protects the rights of the content's copyright holders. One prior art technique for controlling the distribution of digital content is shown in FIG. 1. In this technique, unencrypted content is placed in a server farm that is located behind a secure firewall. A user, such as user 100 desiring access to the content stored in database 106 logs in to the server 104 using a conventional authentication scheme, such as a password or subscription service. Once connected to the server 104, an authorized user 100 can view content and request a copy of that content as indicated by arrow 108. In response to this request, the server 104 retrieves the information from the database 104 as indicated schematically by arrow 110 and displays the content.

This conventional protection technique has several drawbacks. First, many users prefer to view the content with a conventional web browser. In order to display the content in such a browser, it is necessary to download a digital version of the content, as indicated schematically by arrow 112. This digital version is typically stored, at least temporarily, in the computer, and can be printed or forwarded to other users. Therefore, in accordance with another prior art technique, in order to view the content, the conventional browser must be equipped with a plug-in, ActiveX components or another program which controls the browser and disables the printing function and prevents forwarding the content to unauthorized users. However, in order to use this system, it is necessary to first download and install the plug-in, the ActiveX libraries or other program, before the content can be viewed. In addition, since the content is not encrypted when it is downloaded to the browser, it can still be stored and then later printed or forwarded to other users.

Another conventional protection technique is called a "secure container" system. In this system, the content is delivered to the user in an encrypted form and is decrypted at the user's site by means of a decryption key. This technique provides a solution to protecting the document during delivery over insecure channels, but has the same drawback as the firewall system in that the content must still be decrypted in order to present it to the user. The decrypted content can be stored and then later printed or forwarded to other users.

In both of these prior art systems, all of the content is located at the publisher's location. Thus, multiple and often substantial downloads from the publisher's location to the user's site are required for users to access the content. In many cases, the users are connected to an internal corporate network, or corporate intranet, that is, in turn, connected to the Internet by means of a firewall and this latter firewall often interferes with the content downloads. Further, many corporate entities find it desirable to manage the information at their own sites using their own hardware and, in many cases, proprietary software.

SUMMARY OF THE INVENTION

In accordance with the principles of the invention, a content server is located at the user's site. This server delivers content locally to users at the site and logs content access at the site. The server also provides additional content encryption, log authentication, key transfer and key management services to ensure the security and authenticity of content data without substantially interfering with the user access.

Rather than downloading each content document on demand from the publisher location to the user site, at the publisher location, each content document is encrypted and then multiple encrypted documents are assembled into a distribution archive that is also encrypted. The distribution archive is then downloaded into the content server at the user site. When the content server receives the distribution archive, it decrypts the archive file and unpacks the encrypted documents, but does not decrypt each document. Instead, the encrypted documents are stored in encrypted form in a local document database.

In one embodiment, when a user logs into the local content server with a conventional browser, a secure content viewer that consists of an applet is downloaded from the local content server to the user's browser. The content viewer requests a selected document from the local server by referring to the document name or URL. The server retrieves the encrypted document from the local document database and forwards it to the viewer in encrypted form. The viewer then computes a document identifier from the encrypted document content and uses the identifier to request a key from the server in order to decrypt the document. The document identifier is computed so that it identifies the encrypted file, but cannot be derived from the encrypted data in the file alone.

The key is forwarded from the server to the viewer, which then decrypts the document and displays it in the viewer. Since the document is processed by the viewer and displayed only in a window associated with the viewer, none of the conventional browser functions has to be disabled. Further, since the document is downloaded in encrypted form, it cannot be stored or forwarded using the conventional browser.

In another embodiment, a document identifier for each document is computed at the publisher's location from the encrypted document content and stored with the decryption key in an identifier/key list. The identifier/key list is stored in encrypted form in the distribution archive and sent to the local content server at the user site along with the encrypted document content.

In still another embodiment, the local content server logs content access at the site including various user activities, such as login to the system, registration, creation of a user profile and the reading and printing of selected content documents. The logged activities are stored in a log file at the customer site. This log file is then sent to the publisher in return for a distribution archive containing new content. The contents of the log file can be extracted by a reporting server located at the publisher location, formatted and provided to a reporting client.

BRIEF DESCRIPTION OF THE DRAWINGS

The above and further advantages of the invention may be better; understood by referring to the following description in conjunction with the accompanying drawings in which.

DETAILED DESCRIPTION

The inventive content distribution system, which is called hereinafter a "metrics system", can be configured to run in one of two modes, including a publisher-hosted mode and a distributed mode. In the publisher-hosted mode, the entire distribution system is located at the publisher's premises, whereas in the distributed mode portions of the distribution system are located-on the user's premises. These modes are described in more detail below. A content publisher chooses the configuration that best meets its desired business model, and deploys or configures the application software accordingly.

Figure 1:
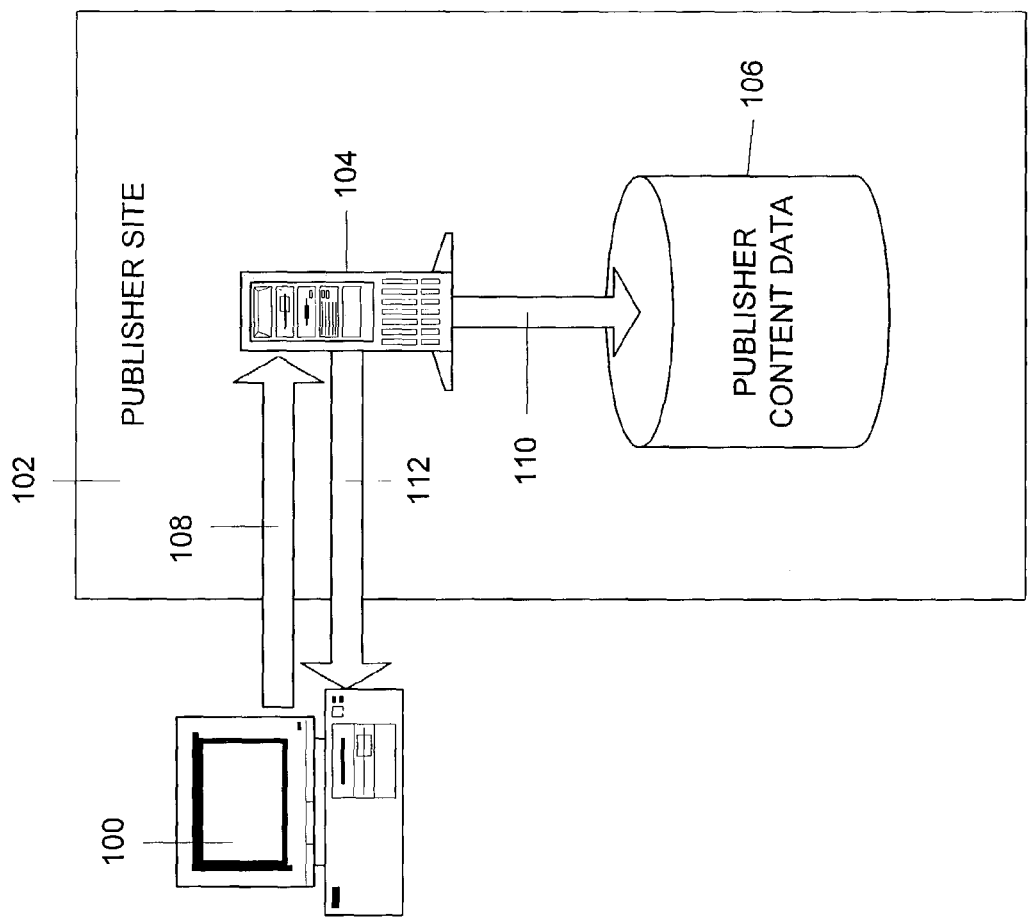
FIG. 1 illustrates a conventional content delivery system in which unencrypted content is located behind a firewall in a publisher server farm.
Figure 2:
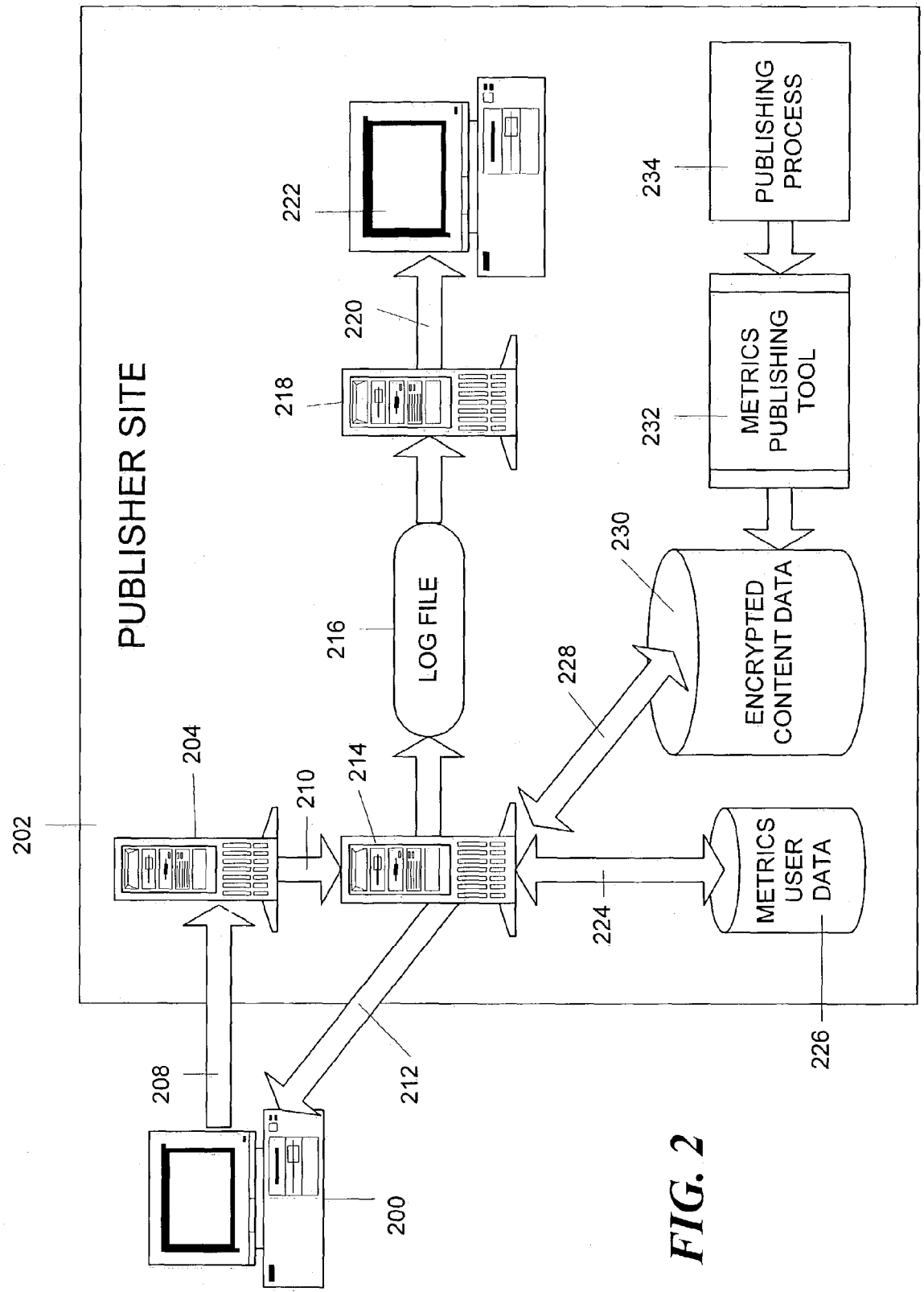
FIG. 2 illustrates one embodiment of the invention in which a metrics server located at a publisher's site receives requests for content from the publisher's server and delivers encrypted content to a viewer located in a user browser.

A block schematic diagram of the content distribution system configured in the publisher-hosted mode is shown in FIG. 2. A user operating a workstation 200 accesses the distribution system over a network through a conventional browser program. Browser programs that are suitable for use with the invention include Microsoft Internet Explorer, Netscape, Opera or other Java 1.1 compatible browsers. Using the browser, the user requests a document either by a file name or by a URL as indicated schematically by arrow 208. This request is received in the publisher's location 202 by the publisher's content server 204. However, rather than accessing the content data 230 directly as in the prior art, the publisher's content server 204 refers the request to a metrics content server 214 as indicated schematically by arrow 210. The metrics content server 214 provides access to the publisher's content stored in database 230. It also creates a log file 216 that records various user activities, including login to the system, registration, creation of a user profile and the reading and printing of selected content.

The contents of log file 216 can be extracted and formatted by a metrics reporting server 218 and provided to a reporting client 222 as indicated schematically by arrow 220.

More specifically, the first time a user 200 accesses the metrics contents server 214, a registration file is created. This file includes user identifying information, such as a user ID, and a password, that the user will utilize to access the system. This information is stored in a metrics user database 226 as indicated schematically by arrow 224. The information in the metrics user database 226 is used later to authenticate users who are requesting access to the publisher content.

The metrics content server 214 interacts with a publisher content database 230 as indicated by arrow 228. Each piece of content in the publisher content database 230 has been processed by encrypting the document and providing a unique identifier called an object identifier (OID) that uniquely identifies that piece of content. This processing is performed by a metrics publishing tool 232 that receives the output of the publisher's conventional publishing process 234. The metrics publishing tool encrypts documents for distribution via the distribution system. The process takes content files (and optionally content metadata files) as input and generates an encrypted document package, document identifier and key data as output. The encrypted output is generated in one of two forms depending on the configuration of the distribution system.

Document level encryption is used when the metrics content server is running at the publisher's own trusted site. In this case, the encryption can be performed in a batch process in order to protect entire collections of content in a single off-line operation. Alternatively, individual files can be dynamically encrypted as they are requested. Distribution level encryption can be used when a portion of the distribution system is running at a customer site. In the distribution-level encryption model, the publisher performs batch processing on content to prepare encrypted bundles or archives that contain document collections. The archives can then be distributed to customers either on portable media, such as compact disks, or via network downloads, for example, via the FTP protocol.

Figure 3:
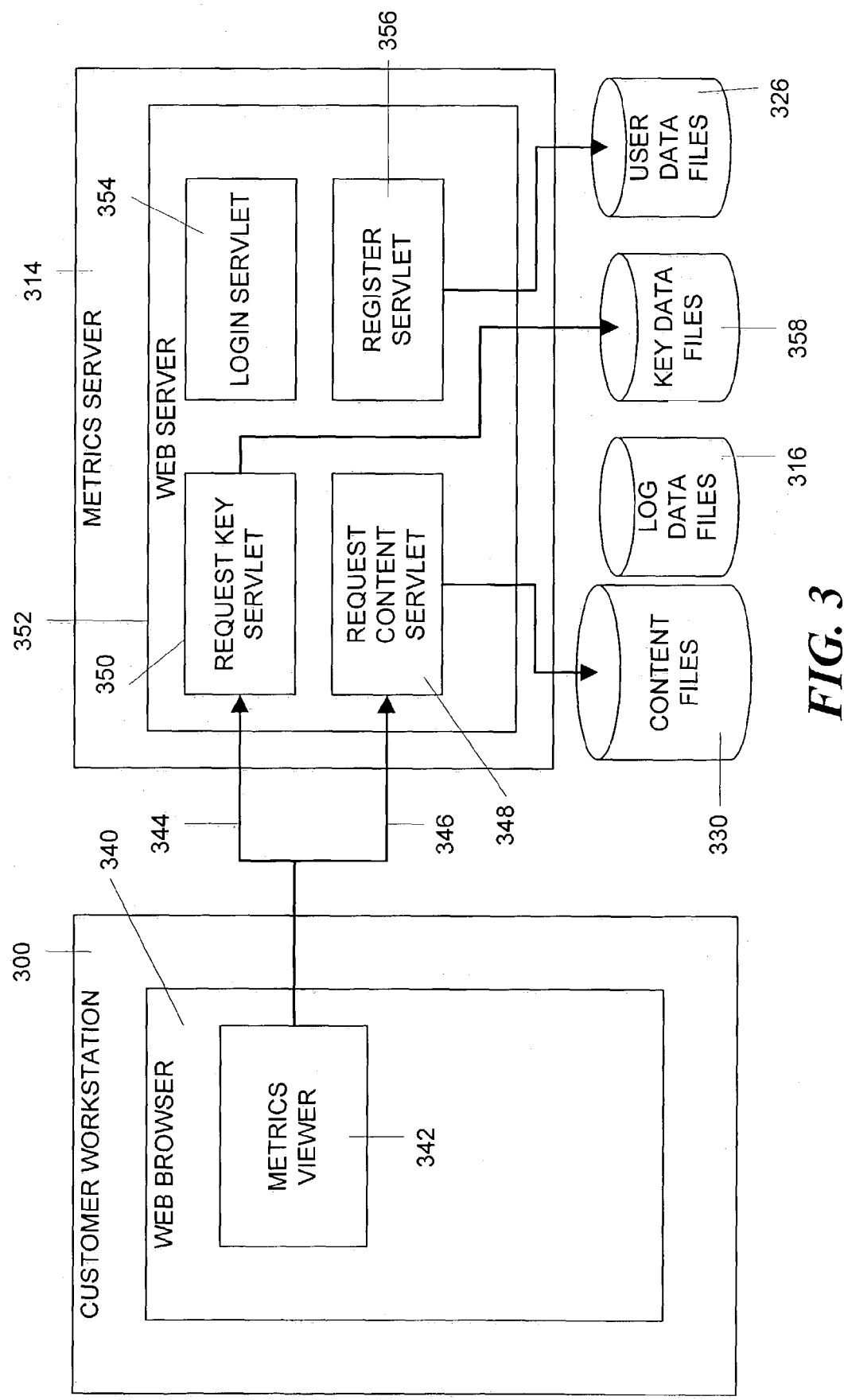
FIG. 3 is a block schematic diagram that shows a more detailed view of the viewer and the architecture of the metrics server.
Figure 4A:
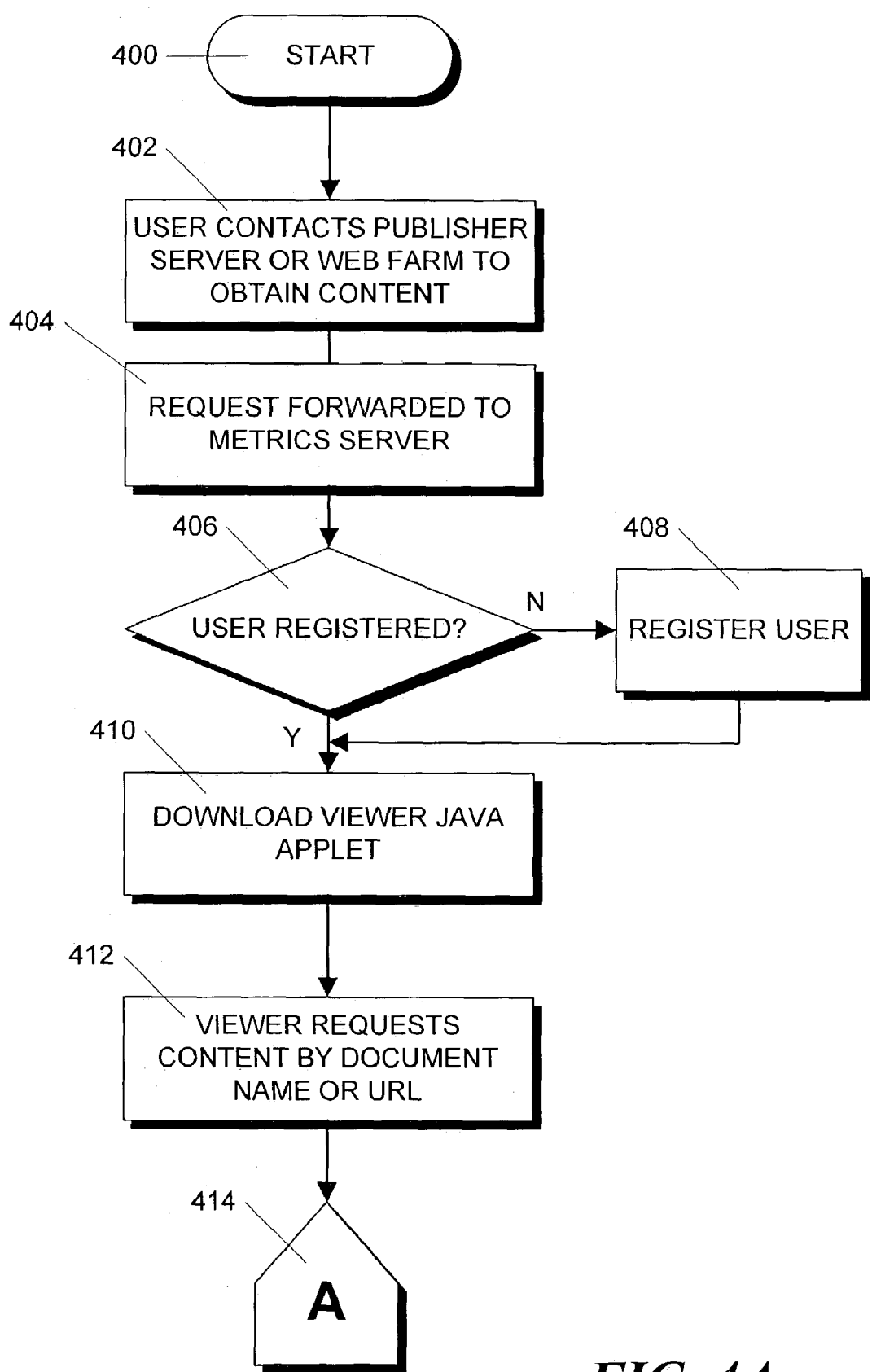
FIGS. 4A and 4B, when placed together, form a flowchart showing the steps of an illustrative process by which a user logins into to a metrics server, downloads and views content.
Figure 4B:
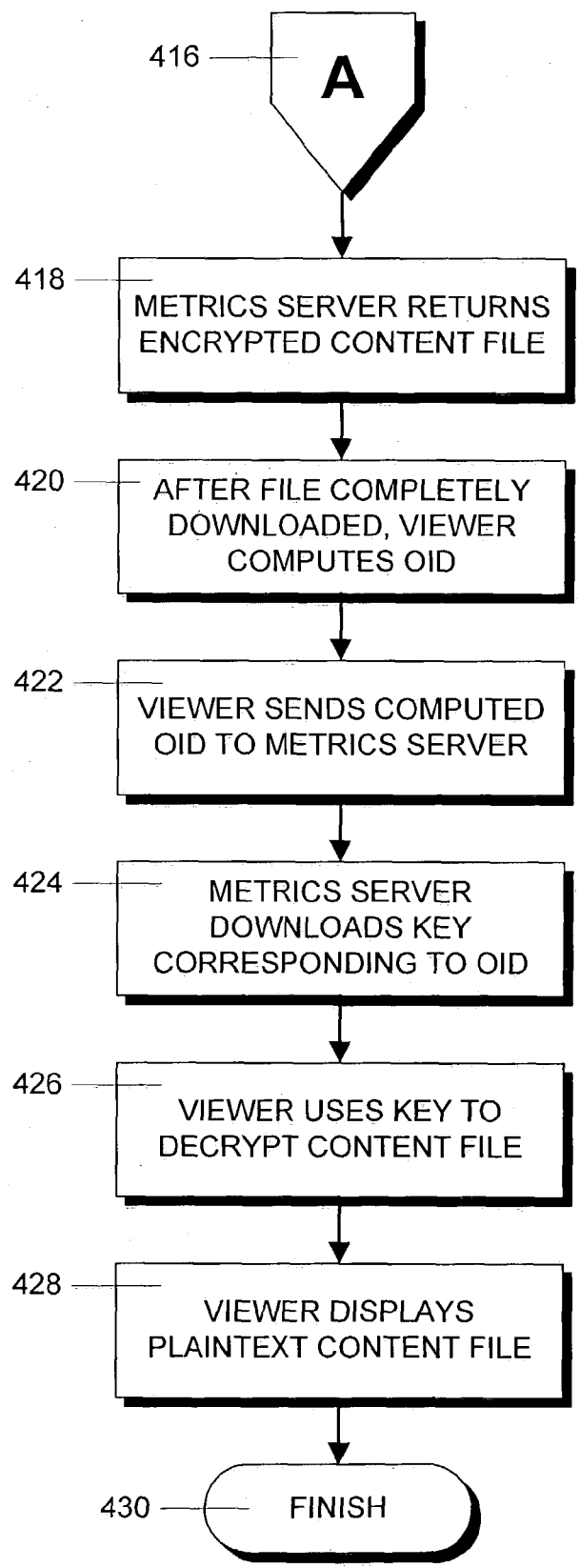

In either the publisher-hosted or the distributed modes, a user accesses the content in the same manner. FIG. 3 shows a more detailed schematic block diagram illustrating the system components involved in a typical request and delivery of content. In this figure, a user at user workstation 300 interacts with a metrics server 314 that could be located at a publisher or user premises by means of a conventional web browser 340 running the work station 300. The steps involved in this process are illustrated in FIGS. 4A and 4B which, when placed together, form a flowchart illustrating the request and delivery of content with the inventive system.

As shown in FIG. 3, the metrics server 314 hosts a web server 352, which actually performs the functions of login, registration and delivery of encrypted content and corresponding decryption keys. This web server can be a conventional web server that acts as a container for a collection of servlets that actually perform the processing. Web server software suitable for use with the present invention is the Tomcat web server available from the Apache Software Foundation, 1901 Munsey Drive, Forest Hills, Md. 21050-2747.

Servlets are programs that run within the web server and process requests from an HTTP client. The servlet container that is bundled with the Tomcat web server supports all servlet activity. In this architecture, the servlet container provides the appropriate libraries to process requests. The servlet container contains four main servlets that perform login, registration and content transfer. These include the login servlet 354, the register servlet 356, the request content servlet 348 and the request key servlet 350. The operation of these servlets is described in conjunction with the flowchart illustrated in FIGS. 4A and 4B.

The content request and delivery process begins in step 400 and proceeds to step 402 where a user desiring a presentation of selected content contacts a publishing service or a web farm to request the content by means of a file name or URL or other identifier. In step 404, this request is forwarded to the metrics server 314. In step 406, the metrics server uses the login servlet 354 to determine whether the user has previously registered with the system. If not, the register servlet 356 is used to update the user data files 326, create a user profile and register the user as set forth in step 408.

After the user has been registered, the metrics server 314 downloads a metrics viewer applet to the web browser 340 operating in the user workstation 300. The metrics viewer 342 is an applet that retrieves and displays secured contents from the metrics server 314. In one embodiment, this applet is a Java applet that operates in conventional browsers. The metrics viewer allows users to access content as they do in their familiar browser environments including reading, printing and emailing of content to other users while retaining control of the content. In a preferred embodiment of the viewer, the list of content use features can be changed by customization. For example, publishers preferring not to allow printing can customize the viewer applet to disable or eliminate the printing feature. In general, the viewer prevents storage of content by preventing storage of the information to the user's storage devices, such as a hard drive.

In one embodiment, the metrics viewer supports the following features: (1) navigation within individual articles and overall navigation from article to article, (2) setting bookmarks to favorite articles, (3) e-mailing an article to a list of e-mail addresses, (4) printing selected articles, (5) logging into the metrics server and registering with the server, and (6) searching by means of a search engine located within the metrics server in installations that support server searching. These operations are initiated by a viewer GUI that includes buttons for each operation. These buttons are trapped so that user activities can be logged as discussed below.

It should be noted that the content is only displayed in a window that is controlled by the viewer and that the viewer does not use any of the standard browser functions. Therefore, the standard browser buttons or menu selections do not affect the display or manipulation of the displayed content and need not be disabled. For example, since the content is displayed only in a window controlled by the viewer, selection of the conventional print function in the browser will print only the content portion displayed in the viewer window and not the entire content document.

After the viewer has been downloaded, the user can then use the viewer 342 to locate desired content. A content article could be identified, for example, by document name or URL. In step 412, the metrics viewer 342 interacts with the request content servlet 348, as indicated schematically by arrow 346, to request a content document. The process then proceeds, via off-page connectors 414 and 416, to step 418 where the request content servlet 348 uses the provided document name or URL to retrieve an encrypted content file from the content files database 330. The metrics server then downloads the encrypted file to the metrics viewer 342.

As set forth in step 420, after the encrypted file has been completely downloaded, the viewer 342 computes the OID for the document. This content identifier is calculated using the encrypted content itself. Although the content identifier can be calculated in many ways, it is important that the identifier cannot be calculated from the content alone. Therefore, the content identifier is related to the content, but not directly derivable from the content.

Figure 5:
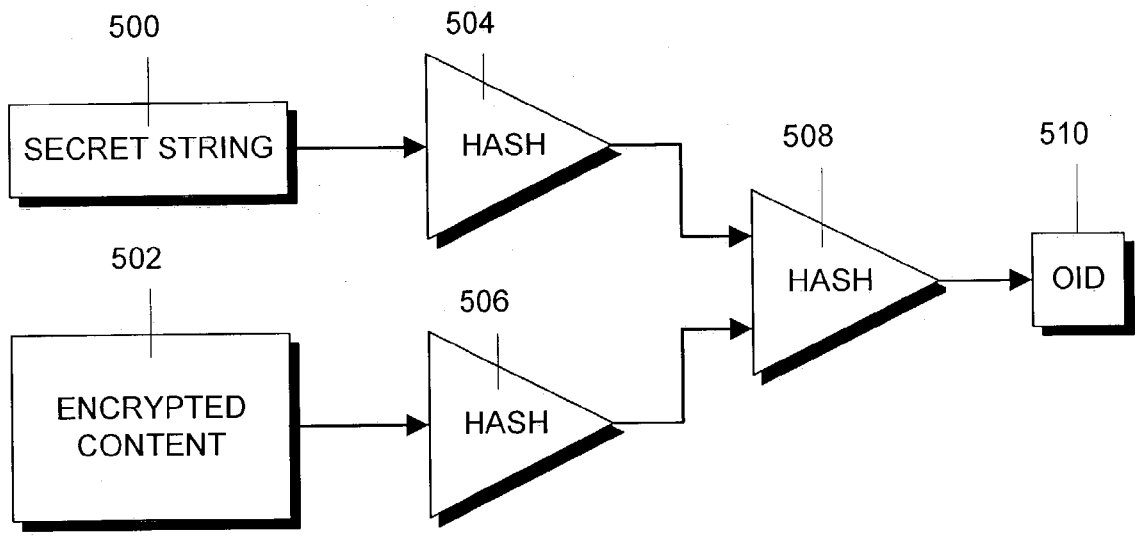
FIG. 5 is a block schematic diagram of apparatus for calculating an object identifier.
Figure 6:
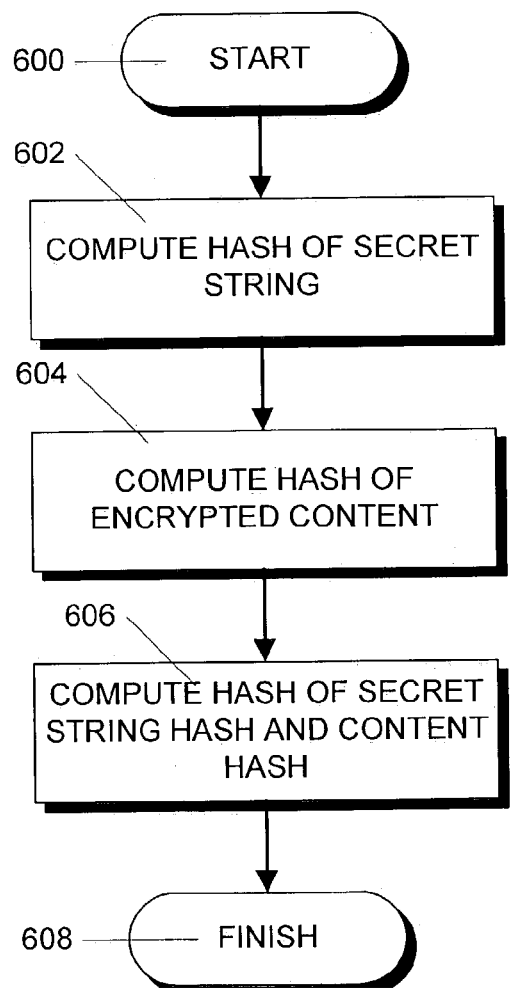
FIG. 6 is a flowchart showing the steps of an illustrative process for calculating an object identifier using the apparatus of FIG. 5.

An exemplary architecture and process for calculating the OID are shown in FIGS. 5 and 6, respectively. The process begins in step 600 and proceeds to step 602 where a hash of a secret string 500 is calculated with a one-way hashing mechanism 504. The secret string is embedded in the viewer code so that it is downloaded when the viewer is downloaded. The secret string may be obfuscated in the viewer code in a conventional manner to deter reverse engineering of the viewer code.

The one-way hashing algorithm used by mechanism 504 to create this hash, for example, may be an SHA-1 secure hashing algorithm as described in FIPS 180-1 at the web site located at URL http://www.itl.nist.gov/fipspubs/fip180-1.htm. Then, in step 604, a hash of the encrypted content item 502 is computed, using, for example, the SHA-1 hashing algorithm in one-way hashing mechanism 506. In step 606, the hash computed in step 602 is hashed with the hash computed in step 604 using, for example, the SHA-1 algorithm again in hashing mechanism 508. The process then ends in step 608. The resulting OID value 510 is mathematically likely to be unique to the particular encrypted file, and cannot be derived from the data in the file alone.

Returning to FIG. 4B, in step 422, the viewer requests a key for decrypting the file using the OID computed from the encrypted content. In particular, the metrics viewer 342 sends the OID to the request key servlet 350 as indicated schematically by arrow 344. The request key servlet 350 retrieves a decryption key from the key database 358 using the OID to access the database. As set forth in step 424, the metric server then downloads the requested decryption key corresponding to the OID to the metrics viewer 342. Next, as set forth in step 426, the viewer 342 uses the key to decrypt the encrypted content file. Finally, as set forth in step 428, the viewer 342 presents the plaintext content file in the web browser 340. The process then finishes in step 430.

In order to operate in the manner set forth in FIGS. 4A and 4B, the content files must first be encrypted and the OIDs generated. As mentioned previously, the encryption is performed by a metrics publishing tool. The steps in this process are set forth in FIG. 7 and the internal architecture of the tool is shown in FIG. 8. The metrics publishing tool is responsible for encrypting the publisher's content and packaging it for distribution. The publishing tool could consist of a command-line utility, controlled through configuration files. Alternatively, it is possible to customize the publisher's publishing environment so that the publishing tool is called through an application programming interface (API).

The publishing process involves encrypting content and providing identifiers for the encrypted content, generating decryption keys and linking the identifiers and the decryption keys so that the decryption key for a requested content document can be located. In order to provide the greatest level of flexibility and the highest level of security the encryption and key management implementations obey the following principles:

1. All encryption algorithms used are established, popular algorithms that are well-understood and believed to be strong. Examples include the Blowfish algorithm, which is a symmetric block cipher that takes a variable-length key, from 32 bits to 448 bits. This algorithm is described in an article entitled "Description of a New Variable-Length Key, 64-Bit Block Cipher (Blowfish)", B. Schneier, *Fast Software Encryption, Cambridge Security Workshop Proceedings* (December 1993), Springer-Verlag, 1994, pp. 191-204. Another example is the RSA public key algorithm of which details are available in the Public Key Cryptography Standard (PKCS #1) of RSA Laboratories at the web site located at URL http://www.rsasecurity.com/rsalabs/pkcs/. The encryption and key management implementation does not rely on particular assumptions about any of the algorithms that it uses; that is, another algorithm, such as the Advanced Encryption Standard (AES, details available at http://csrc.nist.gov/CryptoToolkit/aes/rijndael/), could be substituted for the Blowfish algorithm, an elliptical public key algorithm could be substituted for the RSA public key algorithm, and so on.

2. All keys are exchanged with a secure protocol. Such a protocol is the Diffie-Hellman key exchange protocol that is described in PKCS #3 available at RSA Laboratories at the web site located at URL http:/www.rsasecurity.com/rsalabs/pkcs/.

3. Encrypted content and its decryption key are never stored or delivered together in the same file or transmission. The decryption key for a content package is delivered either at a different time from the content package, or through a different channel.

4. The relationship between an encrypted content item and its decryption key is never stored. If an encrypted object has an identifier, then the number for its decryption key is derived through a cryptographically strong algorithm. In one embodiment, this algorithm is a variant of a one-way hash such as the aforementioned SHA-1 hash.

5. The system uses as few explicit identifiers as possible. For example, the identifier for a content item is not stored anywhere in the system; instead, the content identifier is calculated from a variant of the encrypted form of the content using a secure hash.

6. There are no plaintext strings in the program object code that can be used directly to compromise the security of the content.

Figure 7:
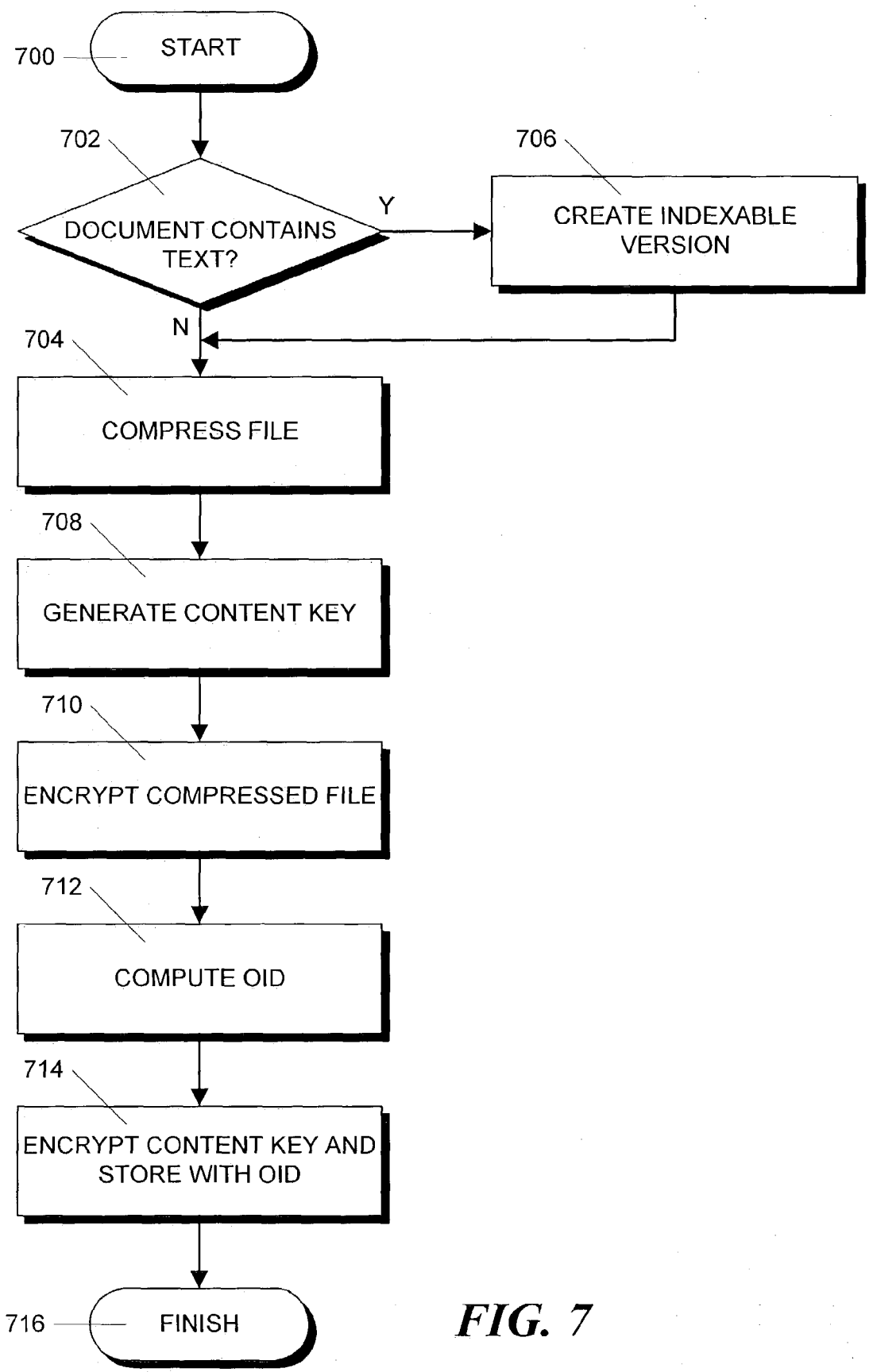
FIG. 7 is a flowchart showing the steps of an illustrative process by which a metrics publishing tool prepares a single document for distribution.
Figure 8:
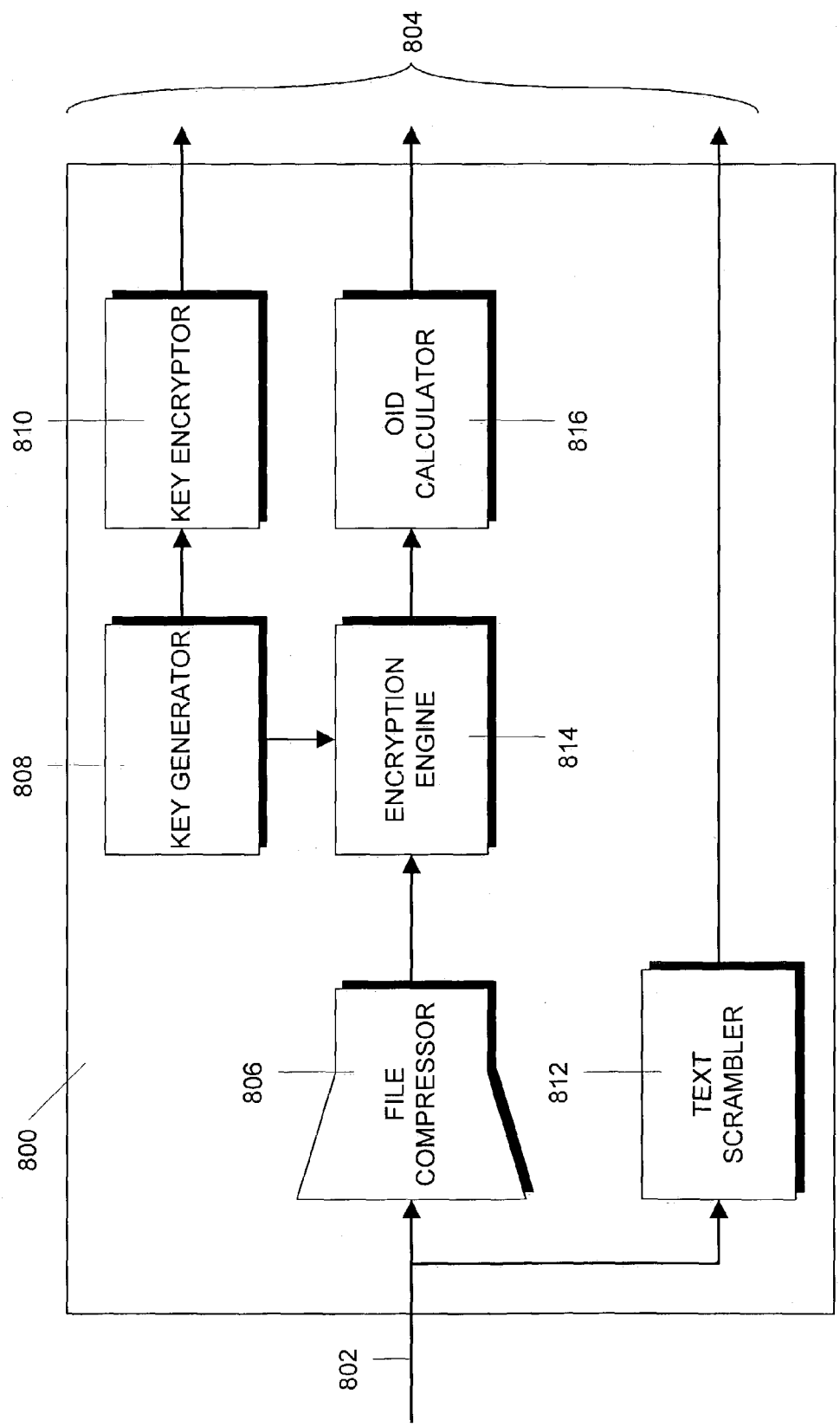
FIG. 8 is a block schematic diagram illustrating the major components of a metrics publishing tool.
Figure 9:
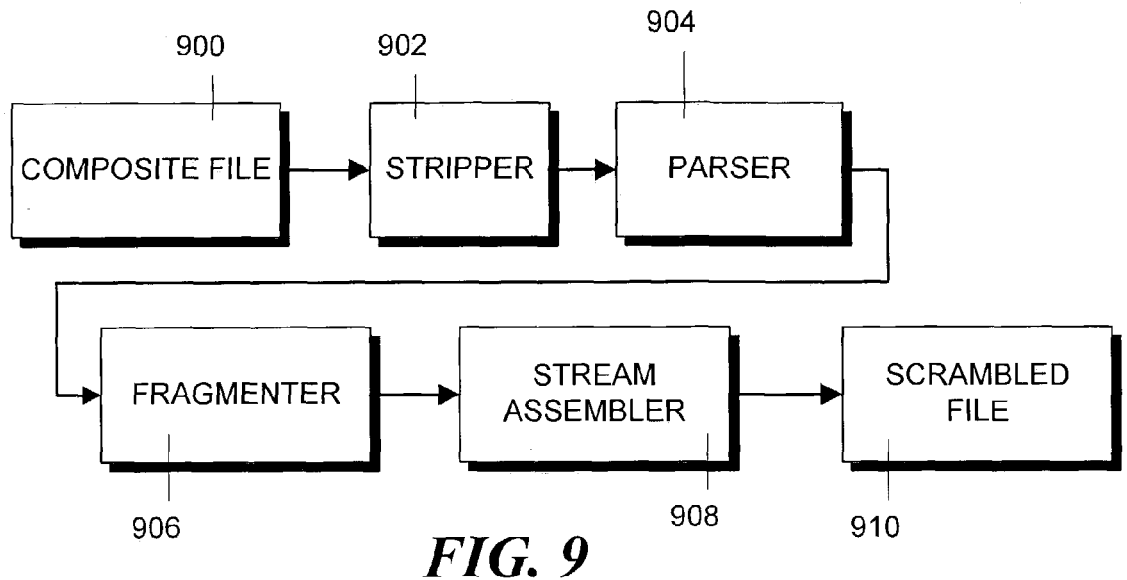
FIG. 9 is a block schematic diagram of apparatus for generating a scrambled text file.

FIGS. 7 and 8 illustrate the operation of a publishing tool 800 in the preparation of a content package that includes a single document for distribution. This process starts in step 700 and proceeds to step 702 where the publishing tool 800 receives a content document 802 as input. A determination is made whether the content document contains text. For content items containing text, in addition to performing the normal processing, the publishing tool 800 contains a text scrambler 812 that performs special processing to create a scrambled, indexable version of the content as set forth in step 706. This processing is described in detail below. The process then continues with the remainder of the normal processing.

Next, in step 704, the publishing tool 800 uses a file compressor 806 to compress the content file using a conventional compression algorithm. For example, "Flate" compression is suitable for use with the invention and is described in detail at the website located at URL http://www.gzip.org/zlib/.

After compressing the file, the publishing tool 800 uses a key generator 808 to generate a unique content key in step 708. For example, in one embodiment, the key generator 808 could operate with the Blowfish algorithm and this key would be a 128-bit Blowfish key. Next, in step 710, the publishing tool 800 uses an encryption engine 814 to encrypt the content item with this unique key. Then, in step 712, the publishing tool 800 uses an OID calculator 816 to calculate a content identifier for the encrypted content item. This content identifier is calculated from the encrypted content by the same algorithm used by the viewer and described in connection with FIGS. 5 and 6. In this case, the same secret string embedded in the viewer code is also embedded in the server code.

Returning to FIG. 7, the OID is stored with the decryption key for the content item. In step 714, the content key is encrypted using the key encryptor 810 with a secret key that is unique to the server. This latter encryption prevents the content key from being discovered by searching the server files. The resulting outputs 804 are then stored in the content database 230 (FIG. 2). The process then finishes in step 716.

As mentioned above, an important feature of the inventive system is the ability to offer text content in a format in which it can be indexed by third-party search utilities and yet not be available as plaintext. The text scrambler 812 uses a process called "content scrambling" to produce an "indexable version" of a composite content file. This process is illustrated in FIGS. 9, 10, 11A and 11B. The process starts in step 1000 and proceeds to step 1002 where the text scrambler receives a composite content file 900 that may contain text and graphics. The text scrambler uses a stripper 902 to remove any formatting information and graphics, producing a stream of plain text. Thus, the text scrambler can handle mixed text and graphic formats such as HTML, Adobe PDF, and Microsoft Office documents.

Next, in step 1004, the text scrambler uses a parser 904 to parse the plain text stream into words. The parsing can be performed in a known manner by using delimiters such as spaces, tabs, etc. to divide the text stream into words. The parser 904 then removes the most common words from the content stream. Such words include common articles, such as "the", "a" and "an", conjunctions, such as "and" and "or", and other common words. In step 1006, a fragmenter 906 breaks the parsed content stream up into random two to five word phrases.

Figure 11A:
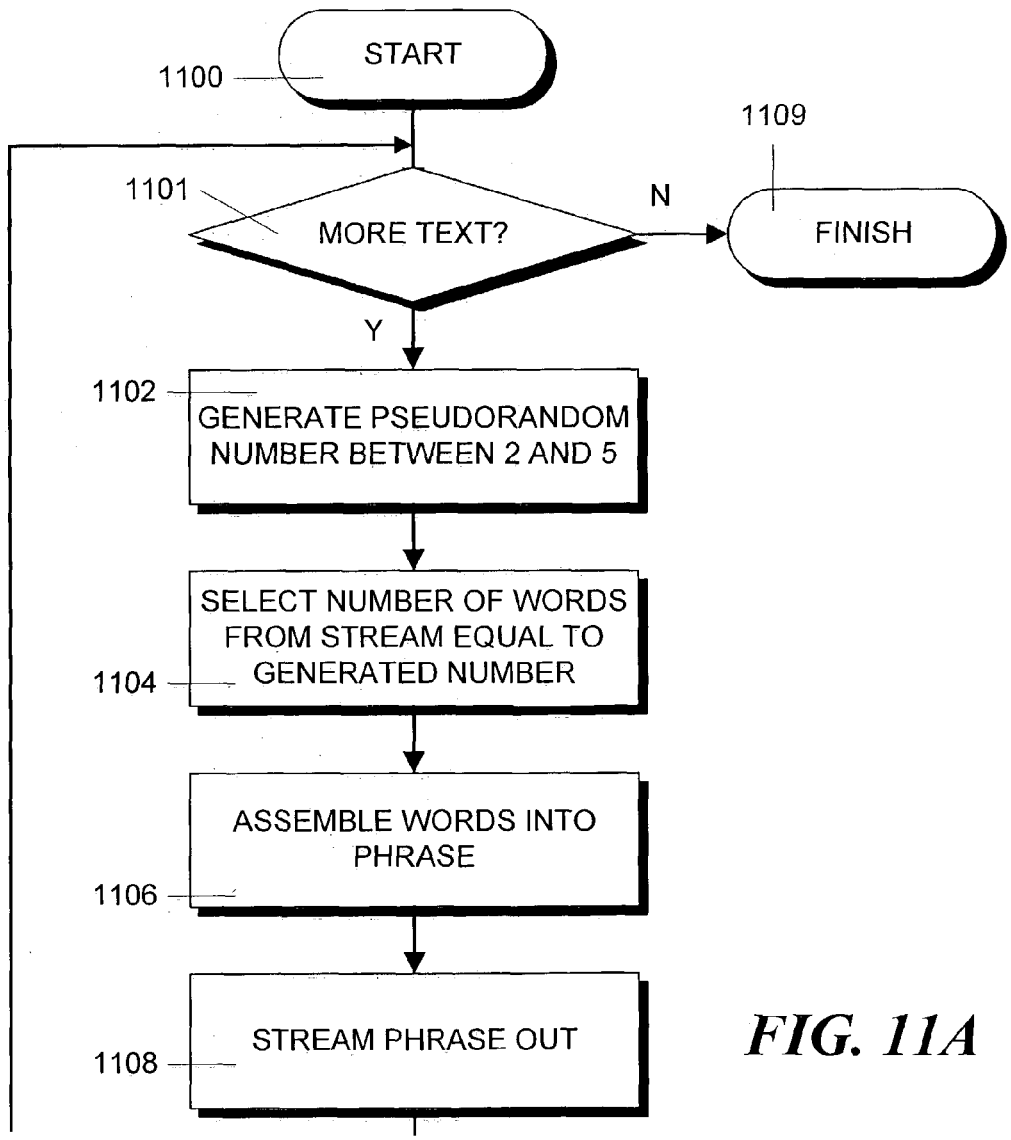
FIGS. 11A and 11B are separate flowcharts that respectively illustrate the operation of the fragmenter and the text assembler of FIG. 9.
Figure 10:
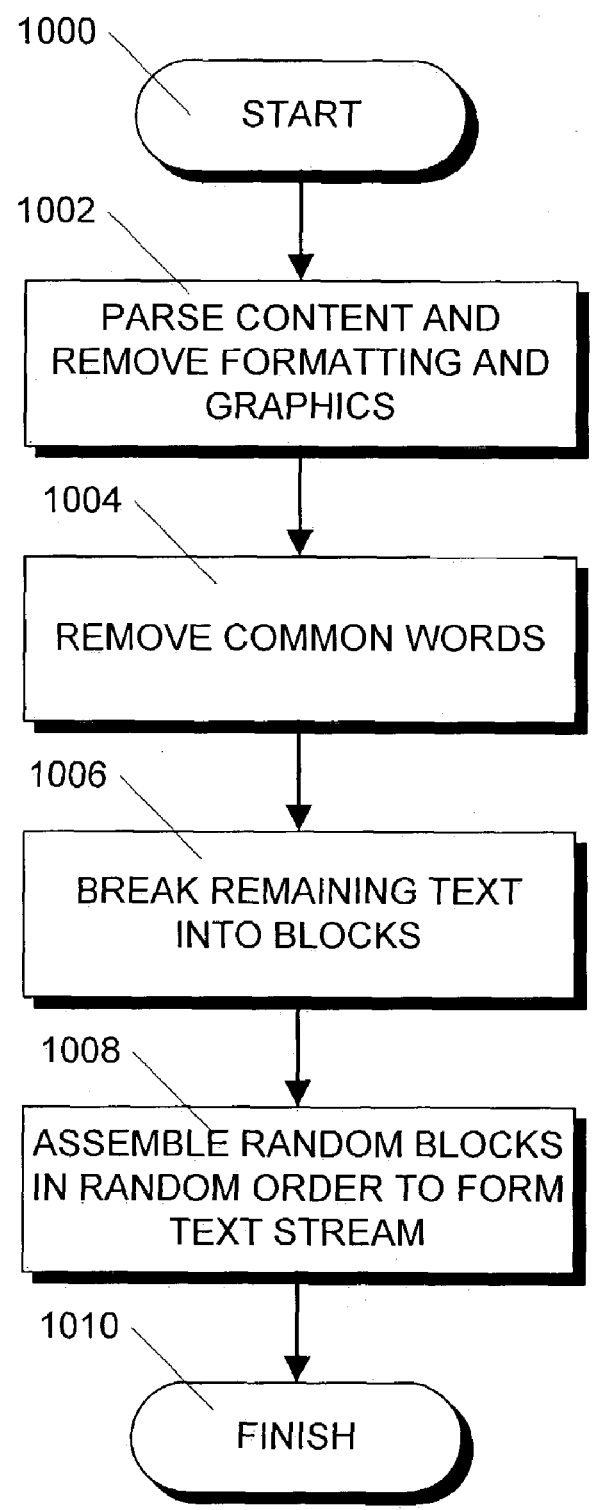
FIG. 10 is a flowchart showing the steps of an illustrative process for generating a scrambled text file using the apparatus of FIG. 9.

The operation of the fragmenter 906 is shown in FIG. 11A. This operation begins in step 1100 and proceeds to step 1101 where a determination is made whether there is more text to be processed. If not, the process ends in step 1109. Assuming there is more text to be processed, then, in step 1102, a pseudo random integer equal to, or greater than, two and less than, or equal to, five is generated in a conventional fashion. In step 1104, a number of words equal to the generated pseudo random number are selected from the stream and the selected words are assembled into a phrase in step 1106. The assembled phrase is streamed out in step 1108. The process then returns to step 1102 where a new phrase is generated starting by generating a new pseudo random number in step 1102. Steps 1104 to 1108 are then performed to generate a new phrase. Operation continues in this fashion until the entire text stream has been processed.

Returning to FIG. 10, in step 1008, the phrases generated by the fragmenter 906 are assembled by stream assembler 908 in random order into an unpunctuated text stream. The manner in which this text stream is assembled is shown in FIG. 11B.

Figure 11B:
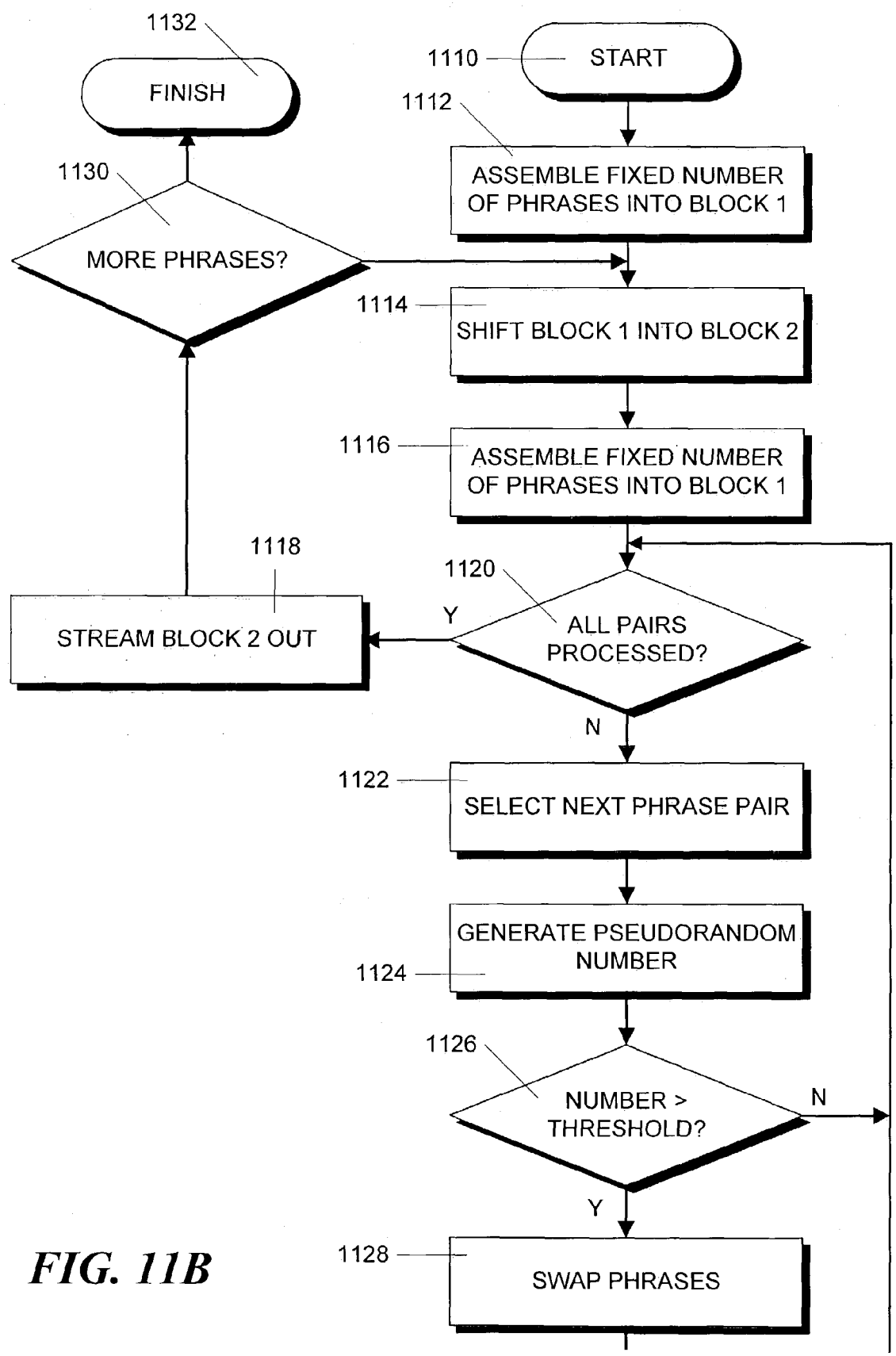

As illustrated in FIG. 11B, the incoming phrases are assembled into "blocks", each of which comprises a fixed, predetermined number of phrases. In particular, the assembly process starts in step 1110 and proceeds to step 1112 where a fixed number of 2-5 word phrases generated by the fragmenter 906 are assembled into a first block.

Proceeding to step 1114, the process then shifts the first block into the second block. In step 1116, the fixed number of phrases is again assembled into the first block. At this point there exist two blocks, both holding the same fixed number of phrases, although the phrases in each block could be of different word lengths. The phrases in the first block are then paired with the phrases in the second block. For example, a phase in the first block can be paired with a phrase in the corresponding location in the second block. Next, a check is made in step 1120 to determine whether all phrase pairs have been processed. If not, the process proceeds to step 1122 where the next unprocessed phrase pair is selected. In step 1124, a pseudo random number is generated for the phrase pair.

In step 1126, the generated pseudo random number is compared to a predetermined threshold. If the generated pseudo random number is greater than the threshold, then, in step 1128, the phrase in the first block is swapped with the phrase in the second block. The process then returns to step 1120 where a decision is made whether all pairs have been processed. Alternatively, if the generated pseudo random number is less than the threshold, then the process returns directly to step 1120.

If, as determined in step 1120, all phrase pairs have been processed, then in step 1118, the second block is streamed out. In step 1130, a decision is made whether additional phrases remain to be processed. If not, the process finishes in step 1132. Alternatively, if additional phrases remain to be processed, then the process returns to step 1114 in which the first block is shifted into the second block and, in step 1116, the first block is filled with the predetermined number of phrases. Operation continues in this fashion until all text phrases have been processed.

The resulting stream contains nearly all of the words in the original content, and most of the phrases, but cannot be read. This unpunctuated text stream is enclosed in a simple HTML file 910 and stored in unencrypted form on the content server where it will be exposed to third-party indexing utilities. These utilities are allowed to crawl the content distribution to build an index of the content. Searching on particular words or phrases will still return most of the same hits as the unscrambled content. However, simply navigating straight to the target file will display to the user a scrambled content file that cannot be read.

When scrambled content is indexed by web-crawling search engines, such as Google™, the inventive distribution system returns the scrambled content. However, when a user uses a browser to link from the search engine to the indexed page, the publisher may prefer to present to the user an e-commerce page containing an unscrambled article extract and an offer to provide the entire, unscrambled article for a purchase price. There are a number of effective techniques to direct the user to the publisher when the user links to the page. For example, browsers and search engines requesting a resource typically supply to the web server a "user agent" parameter that specifies the browser that is requesting the resource. A web server can examine the user agent parameter, and supply the scrambled content to requests containing user agent values that correspond to search engines. Alternatively, the web server can return the publisher's e-commerce page to requests containing user agent values corresponding to browsers.

It is also possible to accomplish the same result by ending the scrambled HTML page with a call to a JavaScript routine that loads the publisher's e-commerce page. In this case, a user at a browser will see the e-commerce page immediately after the scrambled page loads. On the other hand, a search engine will ignore the JavaScript and process only the scrambled page. For cosmetic reasons, the scrambled page in this approach can also be defined to hide the scrambled text from the end user.

Figure 12:
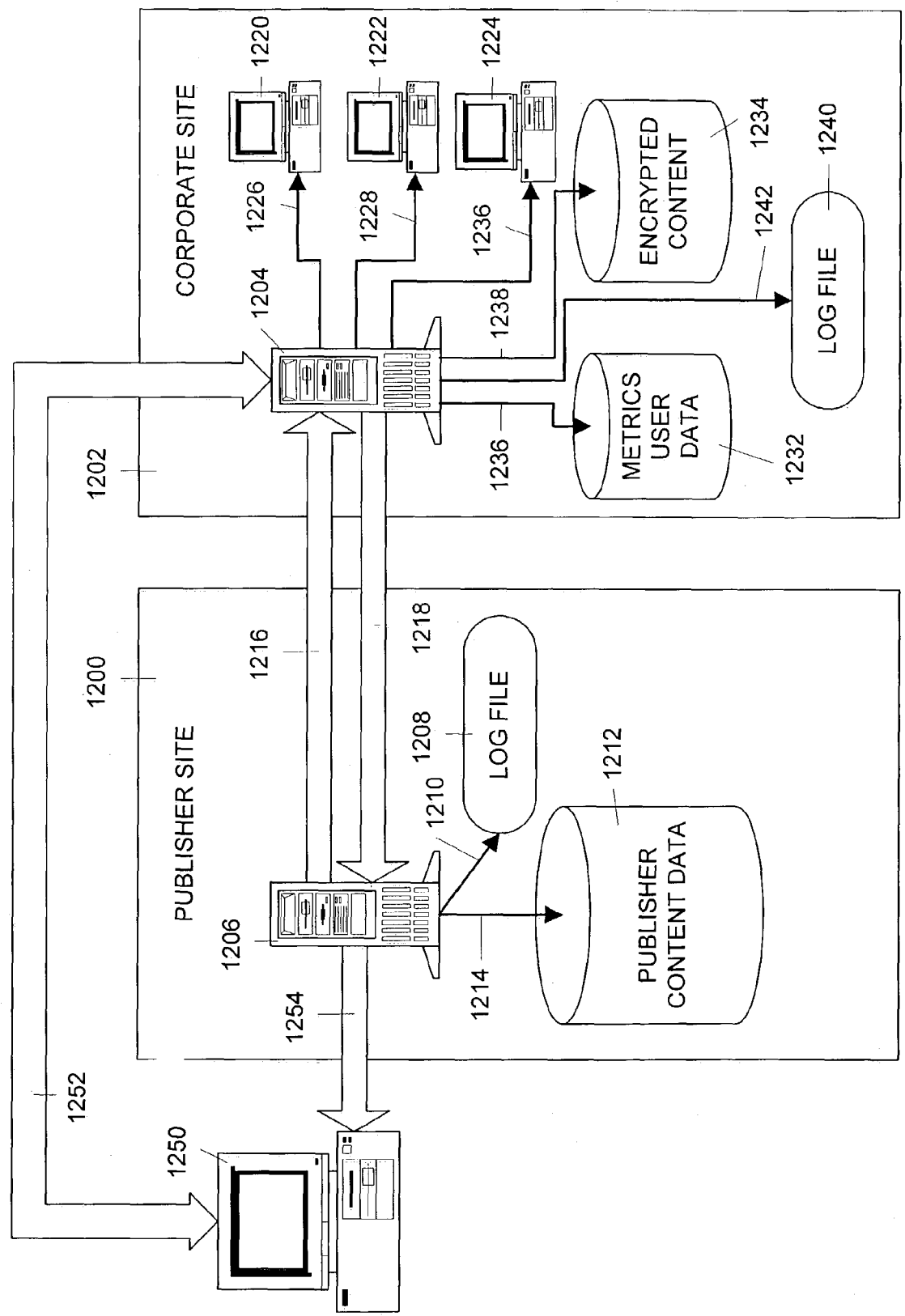
FIG. 12 is a block schematic diagram of an inventive content distribution system operating in distributed mode.

As previously mentioned, the inventive content distribution system can also operate in a distributed mode in which content is provided to users at a customer site from a content server that is also located at the customer site. Such a configuration is shown in FIG. 12. In this configuration, a content server 1204 is located at a corporate site 1202 attached to a corporate intranet or other corporate network. An additional content server 1206 may also be located at the publisher site 1200 to provide controllable and trackable content forwarding as will hereinafter be described. The customer site content server 1204 can also provide content searching capabilities using a conventional search engine such as the Apache Lucene open-source search engine. The content is indexed at load time, using the scrambled text files generated as described below.

The content server 1204 at the customer site manages clients and users at the customer site, performs secure key exchanges with authenticated clients and logs all usage events for later upload to a metrics reporting server. Contrary to the publisher-hosted mode, content is distributed from the publisher's site to the user content server, as indicated schematically by arrow 1216, in blocks of content documents called content distribution archives. Archives might be distributed to customer sites in return for log file information gathered at the customer site as indicated schematically by arrow 1218. The return of log information from the customer site allows the publisher to track content usage at the customer site and to track content forwarding as described below.

As well as containing encrypted documents, the distribution archive is itself encrypted. Consequently, the customer site content server 1204 must unpack the archive and store the encrypted content and keys in the encrypted content database 1234 as schematically indicated by arrow 1238. In order to decrypt the archive during the content loading process, the customer site content server 1204 uses a "scheduled key" to decrypt the archive. The scheduled key for an archive is contained in a previous archive file that was received by the customer. The first time that content is loaded into the customer site server 1204, the scheduled key must be obtained from the publisher, as described below.

In addition to containing the encrypted content files, the archive contains various keys and an OID to decryption key mapping. The OID/Key mapping is also encrypted with the scheduled key. During the unloading process, the encrypted content files are extracted, but not decrypted. The encrypted files are stored in database 1234 and still bear the same names that they did before encryption, but there is no explicit cross-reference between the encrypted files and their decryption keys. In order to find the key that decrypts a given file name, the server receives an OID for the file from a client who is requesting content, then uses the received OID to look up the corresponding key in the OID/Key mapping. The unloading process is described in more detail below.

The customer site server 1204 acts as a conventional server in a client/server application, performing password-based authentication and storing user data in the metrics user database 1232 as indicated schematically by arrow 1236. Data is transferred from the client to the server using the regular HTTP protocol; in cases where the data is secure, encryption is applied to the HTTP payload, rather than using a secure protocol such as SSL. Each client, of which clients 1220-1224 are shown in FIG. 12, can contact the server 1204 as indicated schematically by arrows 1226, 1228 and 1236, respectively, and retrieve content using a process similar to that illustrated in FIGS. 4A and 4B and described in connection with the publisher-based system of FIGS. 2 and 3.

Figure 13A:
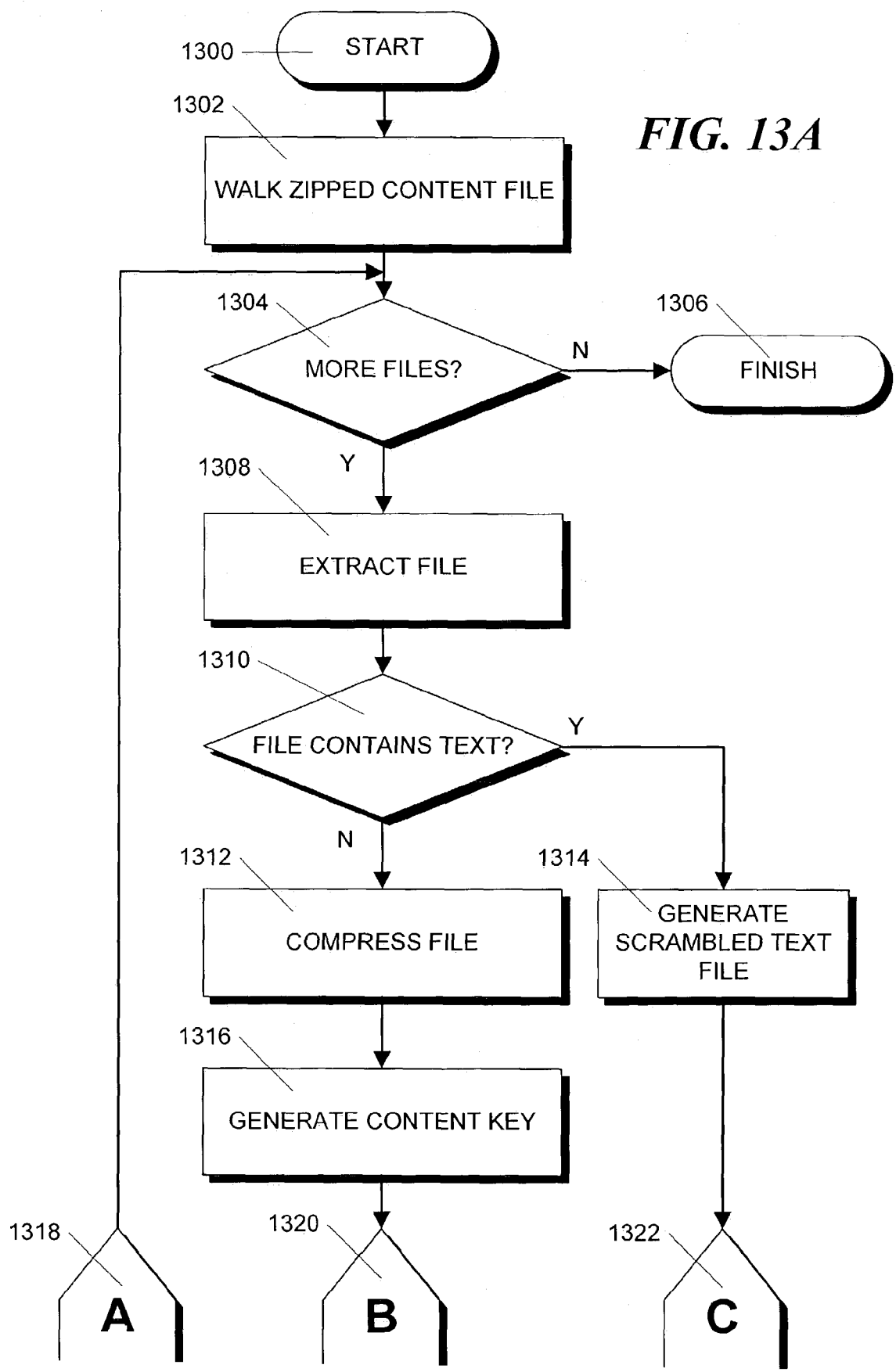
FIGS. 13A and 13B, when placed together, form a flowchart showing the steps of an illustrative process performed by a metrics publishing tool for encrypting documents in the preparation of a distribution archive.
Figure 13B:
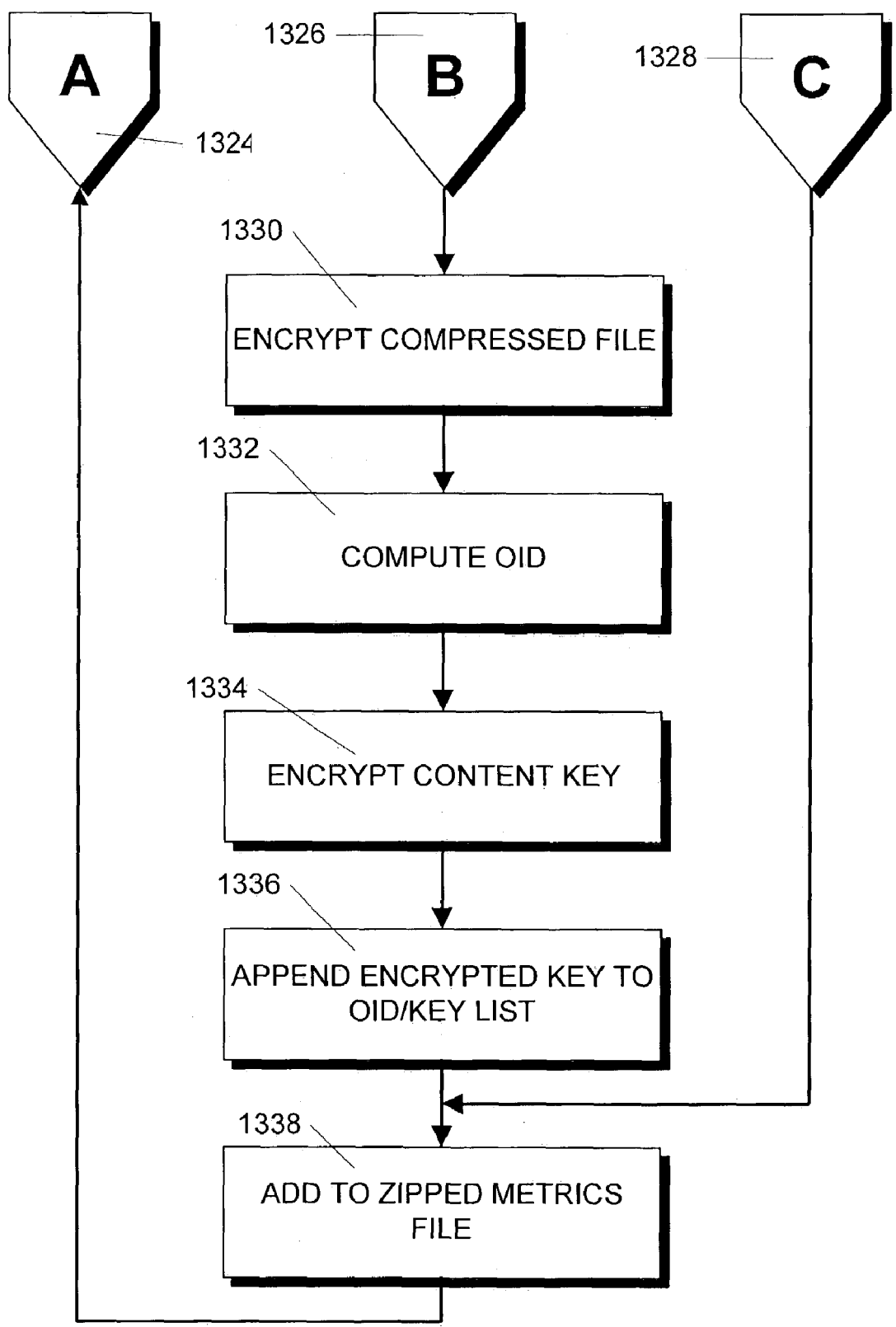
Figure 14A:
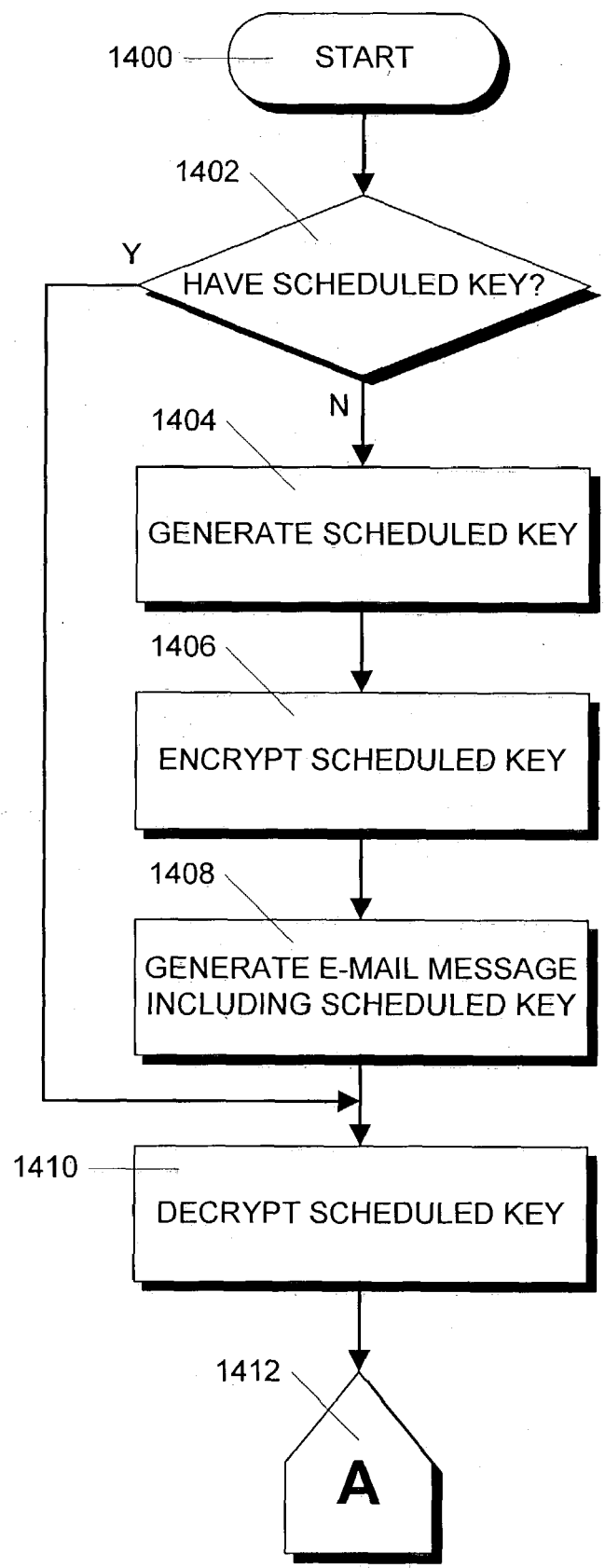
FIGS. 14A and 14B, when placed together, form a flowchart showing the steps of an illustrative process performed by a metrics publishing tool for packaging the encrypted documents and identifying information into a distribution archive.
Figure 14B:
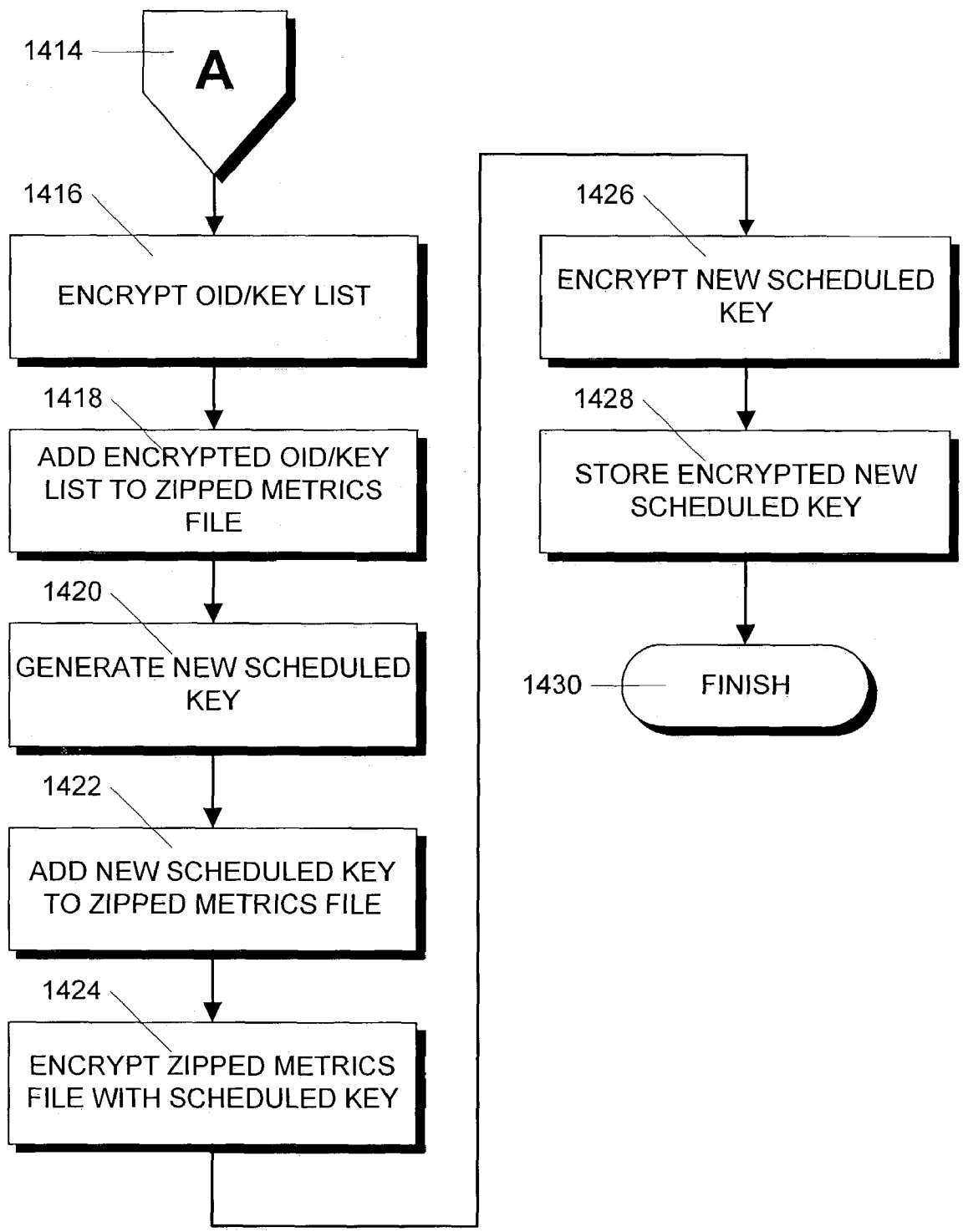

In order to package content documents into a content archive, the publisher uses the publishing tool described above in connection with FIG. 8 that follows the process set forth in FIGS. 13A, 13B and 14A, 14B. The process set forth in FIGS. 13A and 13B illustrates an exemplary process for encrypting the content files. The process set forth in FIGS. 14A and 14B shows an exemplary process for packaging the encrypted content files into a distribution archive.

Generally, the publisher's normal content preparation workflow results in a collection of content files, content files and directories, or compressed content file archives in a location known to the preparation program and specified in a configuration file. Publishers can elect to prepare separate distributions for every customer, with, if desired, different content subsets for each. In this case, a separate configuration file is maintained for each customer. The content preparation process starts in step 1300 and proceeds to step 1302 where the publishing tool examines each file in the content directories, or in the compressed content file archive in a location specified in the customer configuration file. In step 1304, a determination is made whether any files remain to be processed. If all files have been processed, then the process ends in step 1306.

Alternatively, if files remain to be processed, for each content item in the content collection, the publishing tool extracts the file as set forth in step 1308. Then the file is examined and, in step 1310, a determination is made whether the file contains text. For content items containing text, in addition to performing the normal processing, the publishing tool contains a text scrambler 812 that performs special processing to create an indexable version of the content as set forth in step 1314. This processing is described in detail above in connection with FIGS. 9, 10, 11A and 11B. After generating the scrambled file, the process proceeds, via off-page connectors 1322 and 1328, to step 1338 where the scrambled file is added to the distribution archive package as described below.

Next, in step 1312, the content file is compressed in the file compressor 806 using, for example, the aforementioned Flate compression algorithm. Then, in step 1316, a key generator 808 in the publishing tool 800 generates a unique 128-bit content encryption key, using, for example, the aforementioned Blowfish algorithm. The process proceeds, via off-page connectors 1320 and 1326 to step 1330 where the publishing tool 800 encrypts the compressed content item with the unique content key generated in step 1316 using the encryption engine 814.

The publishing tool 800 then calculates a content identifier for the content item as set forth in step 1332 with the OID calculator 816. This process is described above in connection with FIGS. 7 and 8. The resulting value is mathematically likely to be unique to the particular encrypted file, and cannot be derived from the data in the file alone. The OID is used as the content identifier, and is stored with an encrypted content key for the content item.

Then, in step 1334, the content key is encrypted with the key encryptor 810 using the aforementioned Blowfish algorithm. Then, in step 1336, the computed OID and the encrypted content key are appended to a cache corresponding to the archive file. Specifically, the publishing tool caches a list of keys and OIDs as it encrypts every content file. This cache is called an OID/Key mapping.

After each content item is encrypted in step 1330, the resulting encrypted data is stored in a compressed file, the distribution archive, under the same name and in the same relative position: under the archive root as the position of the original file in the original content file. This is accomplished in step 1338. The process then returns, via off-page connectors 1324 and 1318 back to step 1304 to determine if additional files need to be processed. Operation continues in this manner until all files have been processed. The result is an archive file containing encrypted content files and an OID/Key mapping for each file. These two files are then packaged into the final distribution archive by the process shown in FIGS. 14A and 14B.

There are two slightly different processing flows for content packaging, depending on whether a particular subscription or distribution (to a particular customer or group of customers) is the first distribution to that customer or is a subsequent distribution to that customer. In particular, during the packaging process, the OID/Key mapping is encrypted with the aforementioned scheduled key. A new scheduled key is included with each distribution archive. This new key will be used to decrypt the next distribution archive received by the customer. Therefore, the first time a particular customer receives a distribution archive, the customer will not have the scheduled key and it will be necessary to send the required key to the customer. After the first distribution archive has been received, the customer will have the scheduled key that was delivered in the previous distribution archive.

The packaging process begins in step 1400 and proceeds to step 1402 where a decision is made whether the customer to which the archive is being sent already has the scheduled key. If this is not the first distribution, then the process proceeds to step 1410, which is discussed below. If the intended customer does not have the scheduled key, the process proceeds to step 1404 where the publishing tool 800 generates a new scheduled key using the key generator 808. For example, this key may be a 128-bit Blowfish key. In step 1406, this new scheduled key is encrypted using the key encryptor 810 and, for example, the Blowfish algorithm and a secret key internal to the server. This encrypted key is not added to the archive, but it is stored in a separate file. The encryption prevents the scheduled key from being discovered by searching the server files. The unencrypted key is also sent to the customer via a channel that is separate from the channel used to send the distribution archive. For example, the scheduled key may be e-mailed to the customer as set forth in step 1408.

When the distribution archive is to be packaged, in step 1410 the scheduled key is retrieved from storage and decrypted using the secret server key. The process then proceeds, via off-page connectors 1412 and 1414, to step 1416 where the publishing tool 800 encrypts the OID/Key mapping using the encryption engine 814 with the scheduled key before adding the mapping to the distribution archive in step 1418.

The publishing tool in step 1420 generates yet another key using the key generator 808 (for example, a 128-bit Blowfish key), called the new scheduled key. This new scheduled key is stored in the distribution archive in step 1422 and will be used by the customer to decrypt the next distribution archive that is received. Next, in step 1424, the scheduled key is used to encrypt the entire distribution archive using the encryption engine 814. The new scheduled key is also encrypted with a secret server key in step 1426 and stored in a configuration file for the customer in step 1428. The process then ends in step 1430. At this point, the distribution archive is complete and ready for publication to its customer or customers.

The use of the scheduled keys and next scheduled keys builds a chain of distribution files. However, if a customer misses a distribution or loses a distribution archive file, it will be impossible for the customer to load any subsequent distribution archive files. If this occurs, the customer must contact the publisher and request a new distribution. The publisher then creates a "first-time" distribution archive, with its explicit scheduled key, and transfers the archive and the scheduled key to the customer via separate channels (for example, the archive can be sent via FTP and the key can be sent via e-mail).

Figure 15:
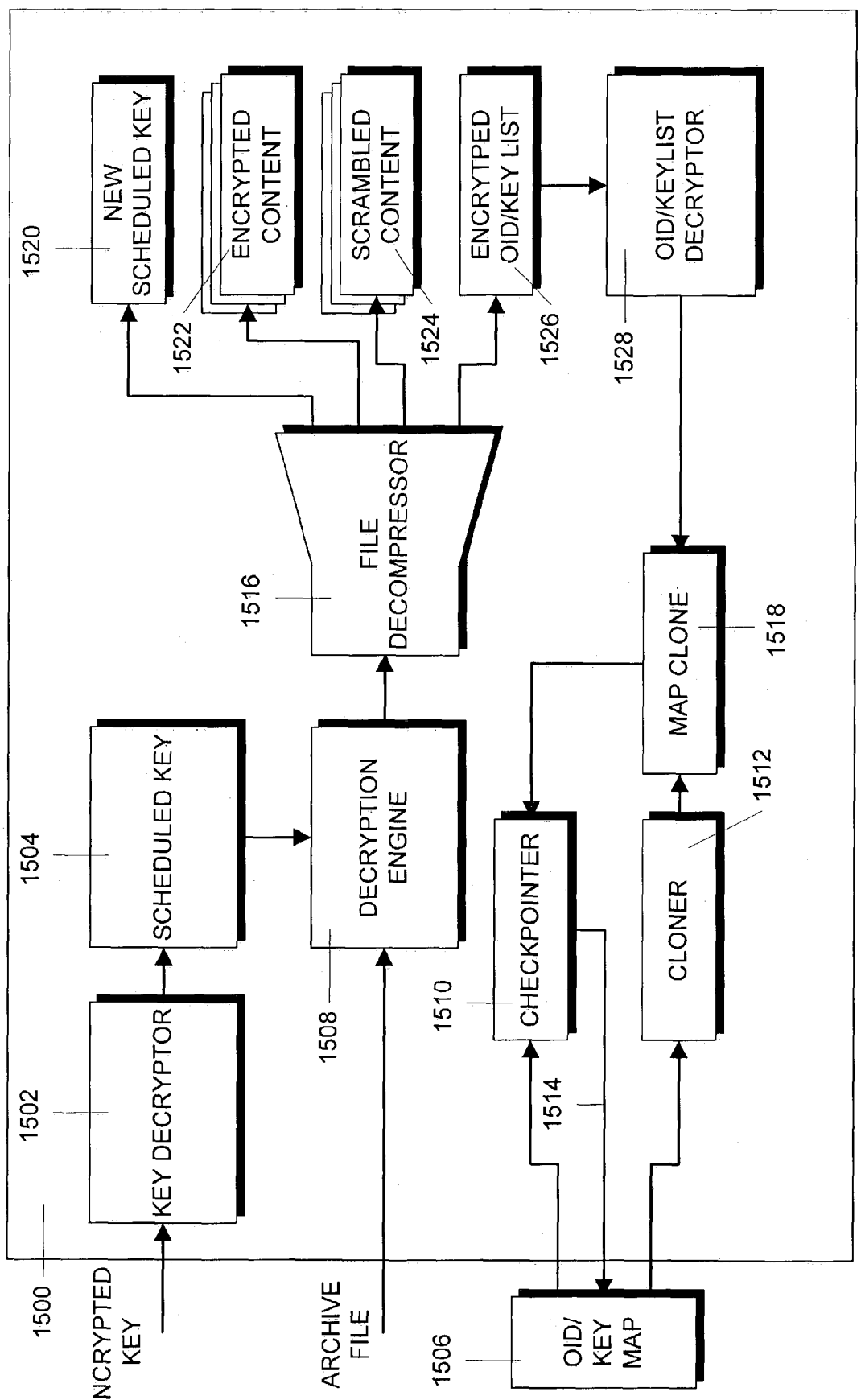
FIG. 15 is a block schematic diagram illustrating the major components of an update manager in a customer site server.
Figure 16A:
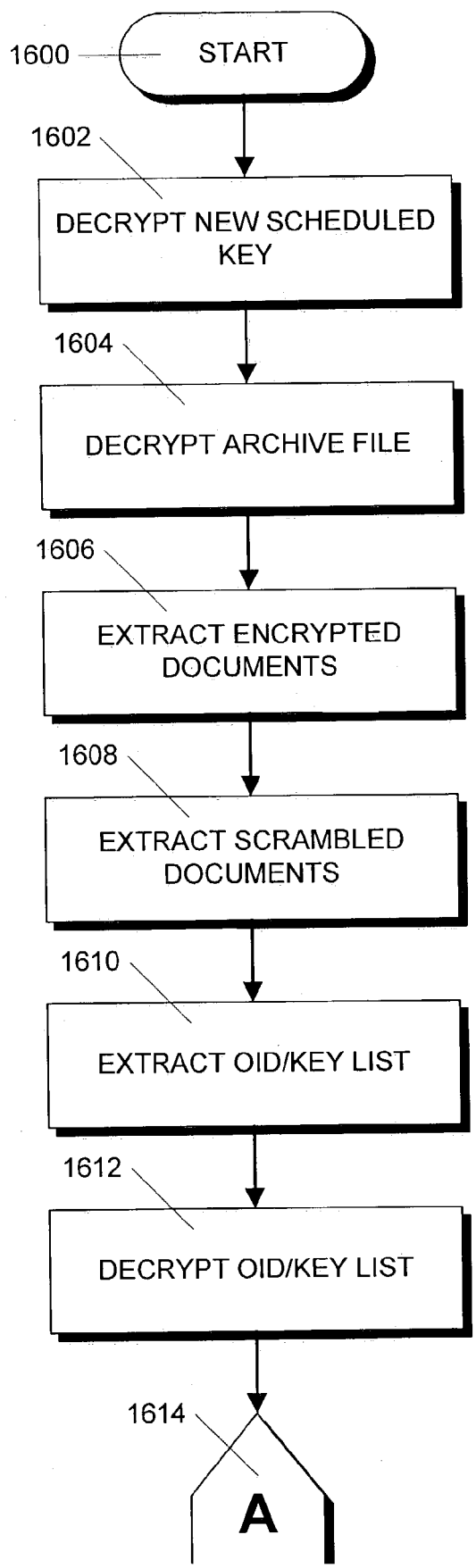
FIGS. 16A and 16B, when placed together, form a flowchart showing the steps of an illustrative process performed by the update manager in lading and unpacking a distribution archive received by a customer site server.
Figure 16B:
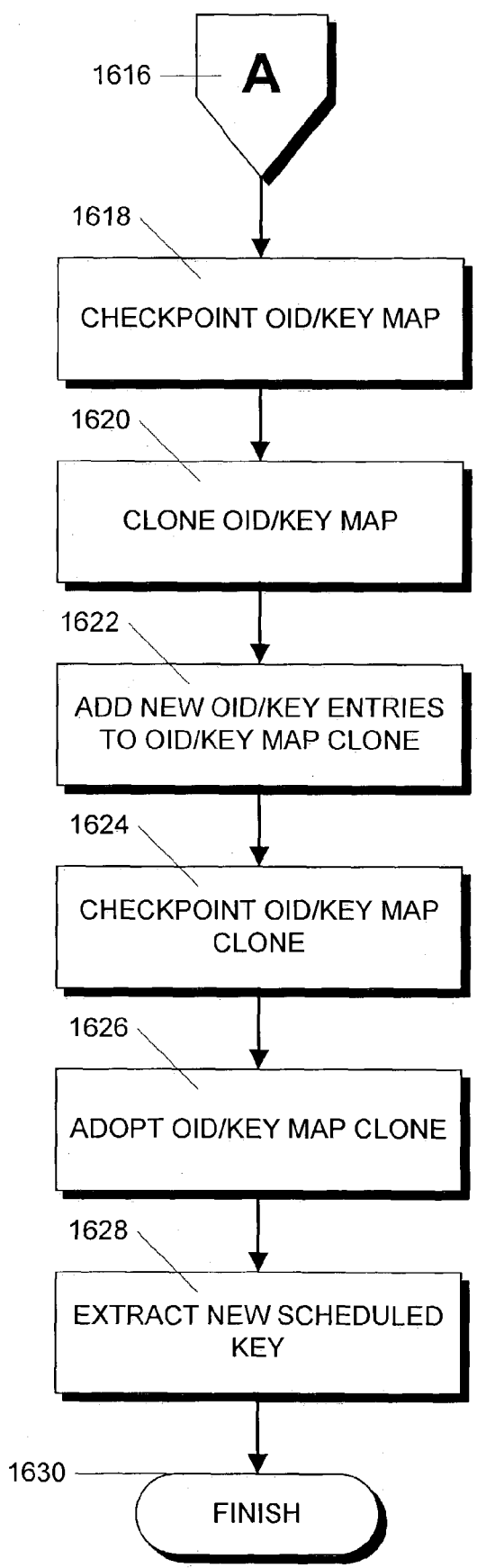

Returning to FIG. 12, when the customer site server 1204 receives a distribution archive it must "unpack" the archive before users can access the content therein. The unpacking process is performed by an update manager and is illustrated in FIGS. 15, 16A and 16B. FIG. 15 illustrates the internal architecture of the update manager 1500 in more detail. The process begins in step 1600 and proceeds to step 1602 where the update manager 1500 uses a key decryptor 1502 to decrypt the scheduled key received with the distribution archive file that was previously received. Then, in step 1604, the decrypted new scheduled key is used in the decryption engine 1508 to decrypt the distribution archive file. The resulting decrypted file contains the encrypted content files, the scrambled content files, an encrypted OID/Key list and an encrypted new scheduled key.

In step 1606, the manager 1500 uses a file decompressor 1516 to extract the encrypted content files 1522. These files 1522 are then stored in the content database 1234 located at the customer site. Next, as set forth in step 1608, the file decompressor 1516 is used to extract the scrambled content files 1524. These files 1524 are then stored in the customer site server in a location at the customer site that will be accessible to third party search engines.

In step 1610, the file decompressor 1516 is used to extract the encrypted OID/Key list 1526 from the distribution archive file. An OID/Key list decryptor 1528 decrypts the OID/Key list using the new scheduled key obtained in step 1602. The process then proceeds, via off-page connectors 1614 and 1616, to step 1618 where the OID/Key map 1506 already existing in the customer site server is checkpointed using checkpointer 1510. The checkpointer 1510 establishes a base state of the map before changes are made so that the map can be returned to its original state if errors occur during the addition of the new OID/Key values received in the archive file.

The existing OID/Key map is then cloned by cloner 1512 in step 1620 to produce a map clone 1518. The new OID/Key entries produced by the OID/Key list decryptor 1528 are then added to the map clone 1518 in step 1622. In step 1624, the checkpointer 1510 is used to checkpoint the map clone 1518. If the checkpointing succeeds, then, in step 1626, the map clone with the added entries 1518 is adopted by overwriting the existing OID/Key map 1506 in step 1626 and as schematically illustrated by arrow 1514. Finally, in step 1628, the file decompressor 1516 is used to extract the new scheduled key 1520 from the distribution archive file for use in decrypting the next distribution archive file. The process then ends in step 1630.

Figure 17:
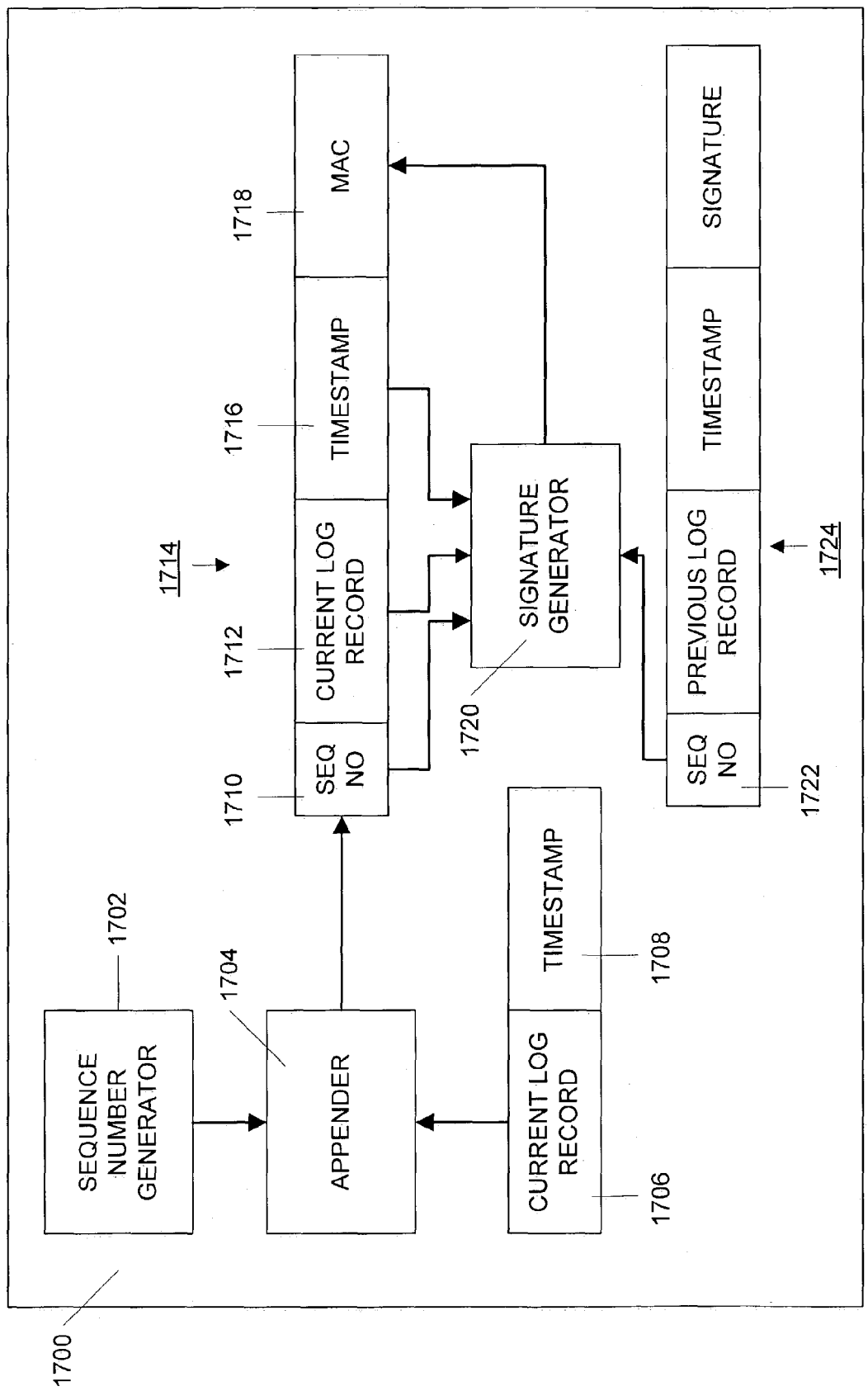
FIG. 17 is a block schematic diagram of the major components of a logging apparatus, illustrating the signing of log entries.
Figure 18:
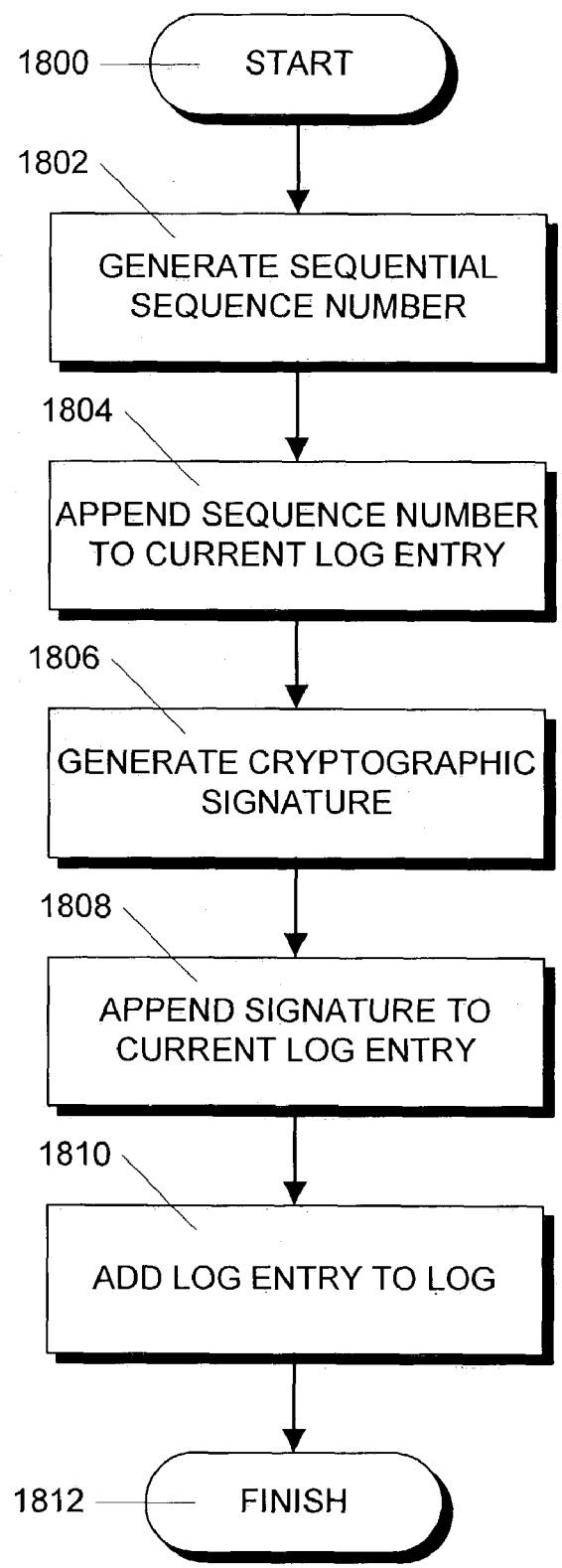
FIG. 18 is a flowchart showing the steps of an illustrative process for signing a log entry using the apparatus of FIG. 17.

Returning to FIG. 12, the client site server 1204 logs all client activity that occurs at the customer site in a plaintext log file 1240 as indicated schematically by arrow 1242. Such activity could include accessing and opening a document, selecting a document, searching or printing a document. The log file 1240 is kept in plaintext so that privacy-conscious customers are able to verify that the log file does not report confidential data. In order to reduce the possibility of file corruption or deliberate modification, the logging apparatus in the server signs each log file entry according to the process illustrated in FIGS. 17 and 18. The process starts in step 1800 and proceeds to step 1802 where the logging apparatus 1700 generates a sequential sequence number by means of the sequence number generator 1702. This number might be a sequential integer. Then, in step 1804, the generated sequence number is appended to the current log record 1706, (which includes the log record data 1706 and the timestamp 1708) by the appender 1704.

Next, in step 1806, the logging apparatus 1700 uses a signature generator 1720 to generate a message authentication code (MAC) 1718 based on the sequence number 1710 appended to the current log record 1712, the current log record data 1712, the timestamp 1716 of the current log record and the sequence number 1722 appended to the previous log record 1724. This signature 1718 is then appended to the current log record 1712 in step 1808. A MAC is an alternative to digital signatures for ensuring data integrity when the protected data is stored locally or when sender and recipient share a secret string or key. A MAC computation is similar to hashing, except that a key is used in the computation so that only someone who knows the key can create or verify a MAC.

In a preferred embodiment, the MAC can be generated by an algorithm called a salted hash algorithm. A salted hash algorithm is a secure hash that has been pre-populated with a secret string. Illustratively, the secure hash algorithm can be the SHA-1 secure hash algorithm discussed above. Other algorithms, such as the SHA-256 or SHA-512 algorithms, could also be used. In addition, other alternative embodiments could use DSS or other signature standards, such as HMAC, instead of the salted hash algorithm. The secret string is known only to the publisher so that only the publisher can verify the MAC.

Finally, the entire log entry 1714 is entered into the log in step 1810. The process then finishes in step 1812.

Figure 19:
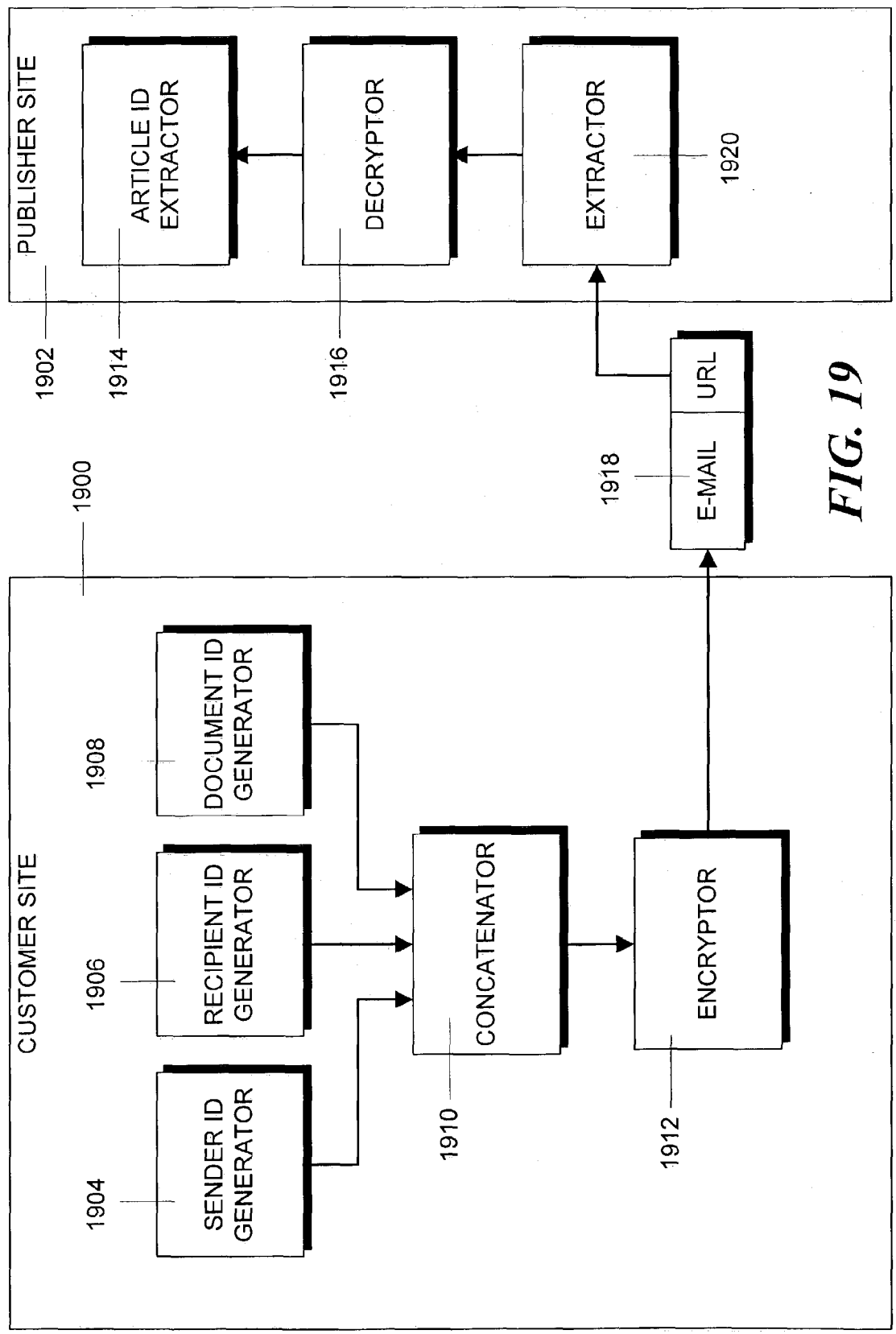
FIG. 19 is a block schematic diagram illustrating the major components involved in creating a forwarding e-mail message and processing a URL received in a forwarding server.
Figure 20:
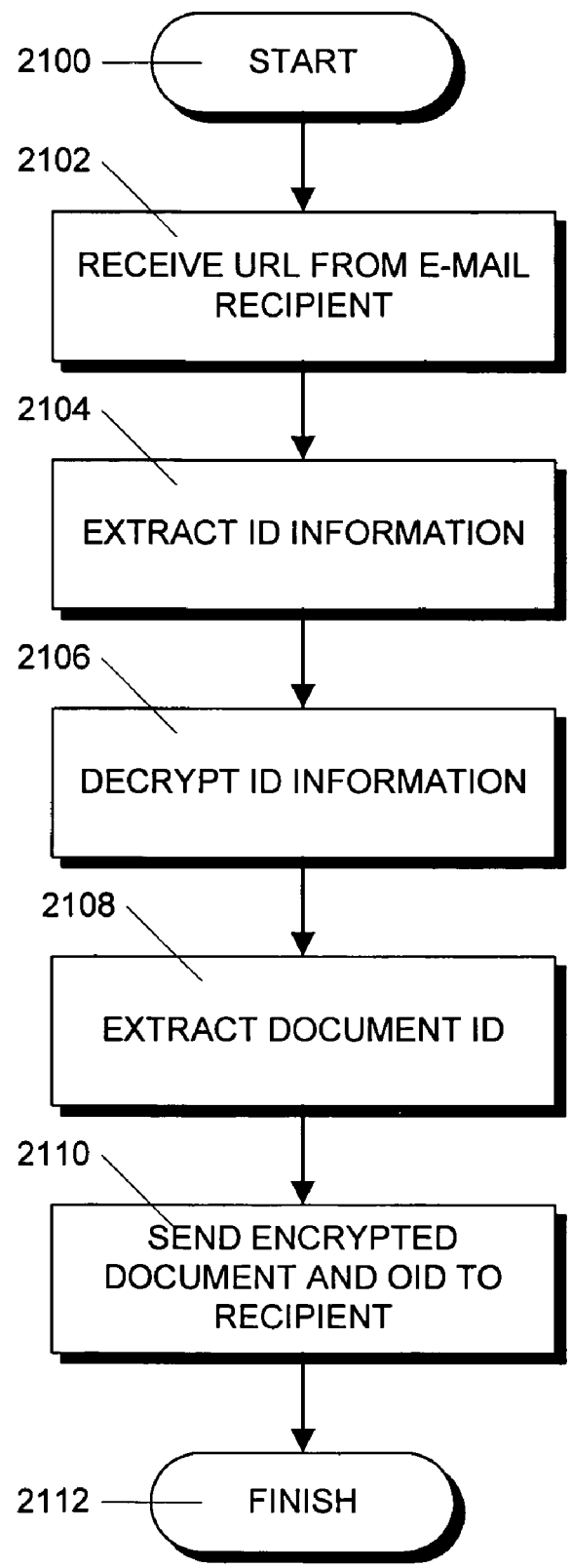
FIG. 20 is a flowchart showing the steps of an illustrative process for processing a URL received in a forwarding server using the apparatus of FIG. 19.

In accordance with another aspect of the invention, in the distributed mode, a client can "forward" a content document to one or more recipient e-mail addresses, including addressees who are not part of the client's corporate network. This forwarding process allows the recipients to access the specified content without losing the content protection. It also allows the inventive distribution system to track usage activity of recipient users in the same fashion as previously-registered users. This process is illustrated in FIGS. 19 and 20. An overall view of the process is illustrated in FIG. 19. The steps in receiving and processing the content document identification information from the e-mail recipient are shown in FIG. 20.

The process begins when a user logged into a customer site server (for example server 1204, FIG. 12) at a customer site 1900 uses the metrics viewer operating in his browser to send an e-mail to another user in order to "forward" a selected content document. The metrics viewer communicates to the customer site server 1204 to prepare an email with a link to the original publisher site 1902. The customer site server 1204 uses a sender ID generator 1904 to generate a sender ID. Generally, the sender ID would be a text string identifying the sender and the sender's corporate network. Next, the server 1204 uses a recipient ID generator 1906 to generate a recipient ID. Generally, the recipient ID would be a text string identifying the recipient and the recipient's corporate network.

Then, the server 1204 uses a document ID generator 1908 to generate an ID identifying the content document that will be forwarded. This content ID might be the document name or URL. A concatentator 1910 concatenates the three IDs and the ID information is encrypted with an encryptor 1912. In one embodiment, this latter encryption might be RSA public key encryption using the public key of the publisher site that originated the content document. The encrypted ID string is then inserted into a URL that appears as a link when the e-mail arrives in the recipient's e-mail program or browser Subsequently, the e-mail 1918 is sent to the recipient.

When the recipient clicks on the link to the publisher in the e-mail, a supported browser is opened and the browser navigates to a "forwarding" metrics server in the publisher's site. This server might be server 1206 in publisher site 1200 as shown in FIG. 12. During this process, the URL in the e-mail is sent to the server and processed as set forth in FIG. 20. The server then downloads the metrics viewer described previously into the recipient's browser and launches the viewer as hosted by the server. The recipient then logs into the server 1206 and registers in the fashion described above.

Processing of the URL received at the forwarding server 1206 starts in step 2100 and proceeds to step 2102 where the URL is received from the e-mail recipient. In step 2104, the forwarding server at the publisher site 1902 uses an extractor 1920 to extract the ID information from the URL. Next, in step 2106, a decryptor in the forwarding server decrypts the ID information using the private key of the public/private key pair in the publisher site. Then, in step 2108, a document ID extractor extracts the document ID from the decrypted ID information. The forwarding server uses the document ID to locate the encrypted document information in the encrypted content database 1234. The encrypted content information and accompanying OID are then sent to the e-mail recipient's metrics viewer as set forth in step 2110. The process then finishes in step 2112. Operation then proceeds as set forth in FIGS. 4A and 4B.

The forwarding server 1206 can also log the sender's and recipient's ID information in a local log file 1208 as indicated schematically by arrow 1210. In this manner the forwarding of content can be tracked. The information in log file 1208 and the information in log file 1240 can then be provided to a metrics reporting server (not shown in FIG. 12) that catalogs and formats the information to prepare reports.

Figure 21:
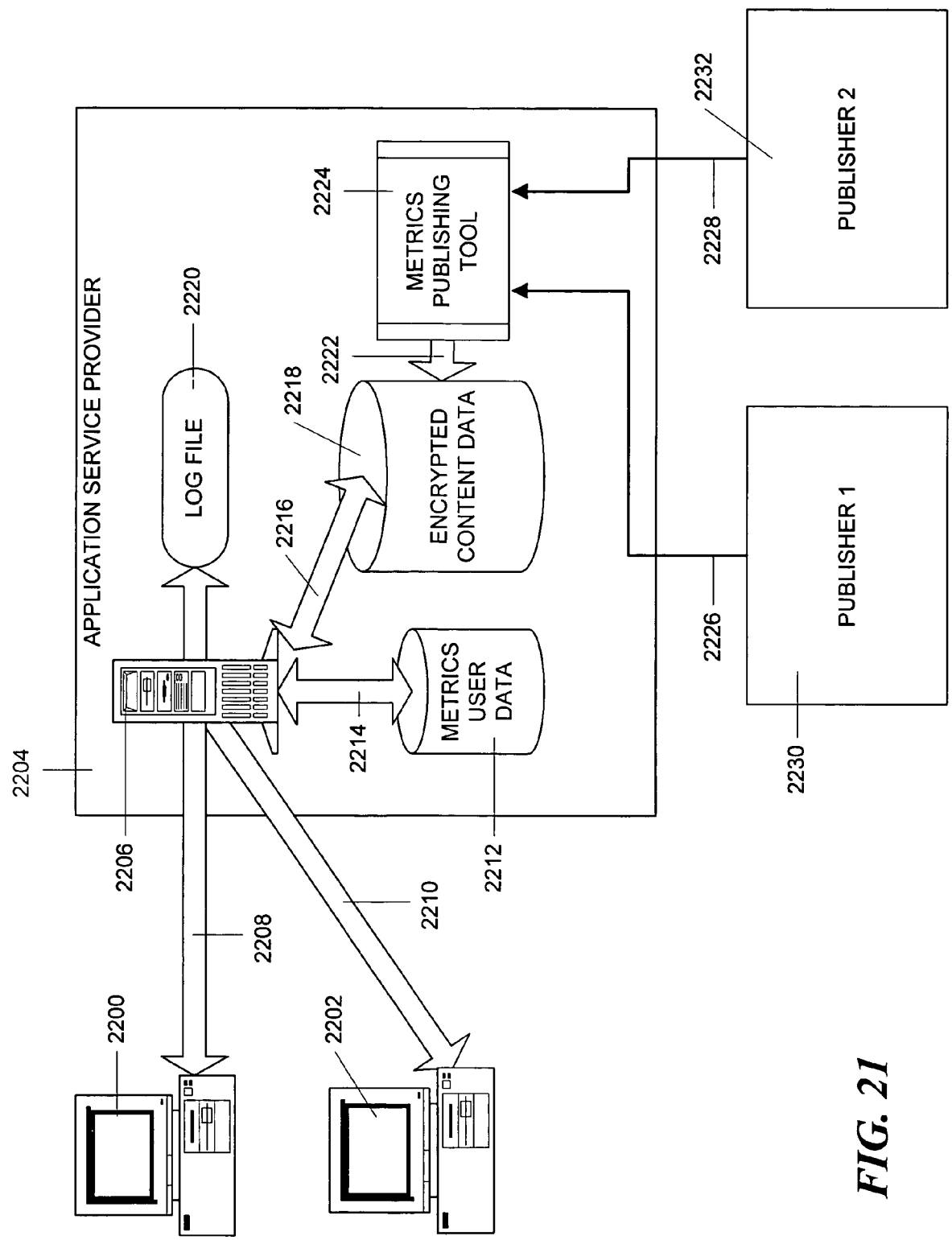
FIG. 21 is a block schematic diagram of an embodiment of the invention in which a metrics server located at an application service provider site receives content from several publishers and requests for content from the publisher's server and delivers encrypted content to a viewer located in a user browser.

A block schematic diagram of another embodiment of the inventive content distribution system is shown in FIG. 21. In this embodiment, the metrics server 2206 is hosted by a third party, called an application service provider 2204. One or more publishers, 2330, 2232, periodically upload new content to the application service provider 2204 using conventional means, such as CDs or network transfers, as indicated schematically by arrows 2226 and 2228, respectively. Content received from the publishers at the application service provider 2204 is processed by a publishing tool 2224 located at the application service provider location 2204 in order to generate encrypted content. The encrypted content is stored in databases 2218 at the application service provider location 2204, as indicated schematically by arrow 2222.

In this embodiment, a document identifier is computed by the metrics server 2206 at the application service provider site 2204 from the encrypted content and stored with a decryption key. Users 2200 and 2202 interested in receiving the content log into the metrics server 2206 at the application service provider site 2204 as indicated schematically by arrows 2208 and 2210, respectively. As indicated schematically by arrow 2214, the metrics server 2206 retrieves user information and profiles from the metrics user database 2212 located at the application service provider site 2204 and uses this information to log in the users as described above.

During the login procedure, secure content viewer software (not shown in FIG. 21) is downloaded into the user's local browser. In order to access the content, the content viewer requests a selected document from the application service provider server 2206 by referring to a document name or URL. As indicated schematically by arrow 2216, the server 2206 retrieves the document from the content database 2218 and forwards it to the viewer in encrypted form. The viewer then computes a document identifier from the encrypted document content and uses the identifier to request a key from the server 2206 in order to decrypt the document. The key is forwarded from the server 2206 to the viewer, which then decrypts the document and displays it in the viewer.

The metrics server 2206 at the application service provider site 2204 can also generate a usage log 2220 in order to track login to the system, registration, creation of a user profile and the reading and printing of selected content.

Figure 22:
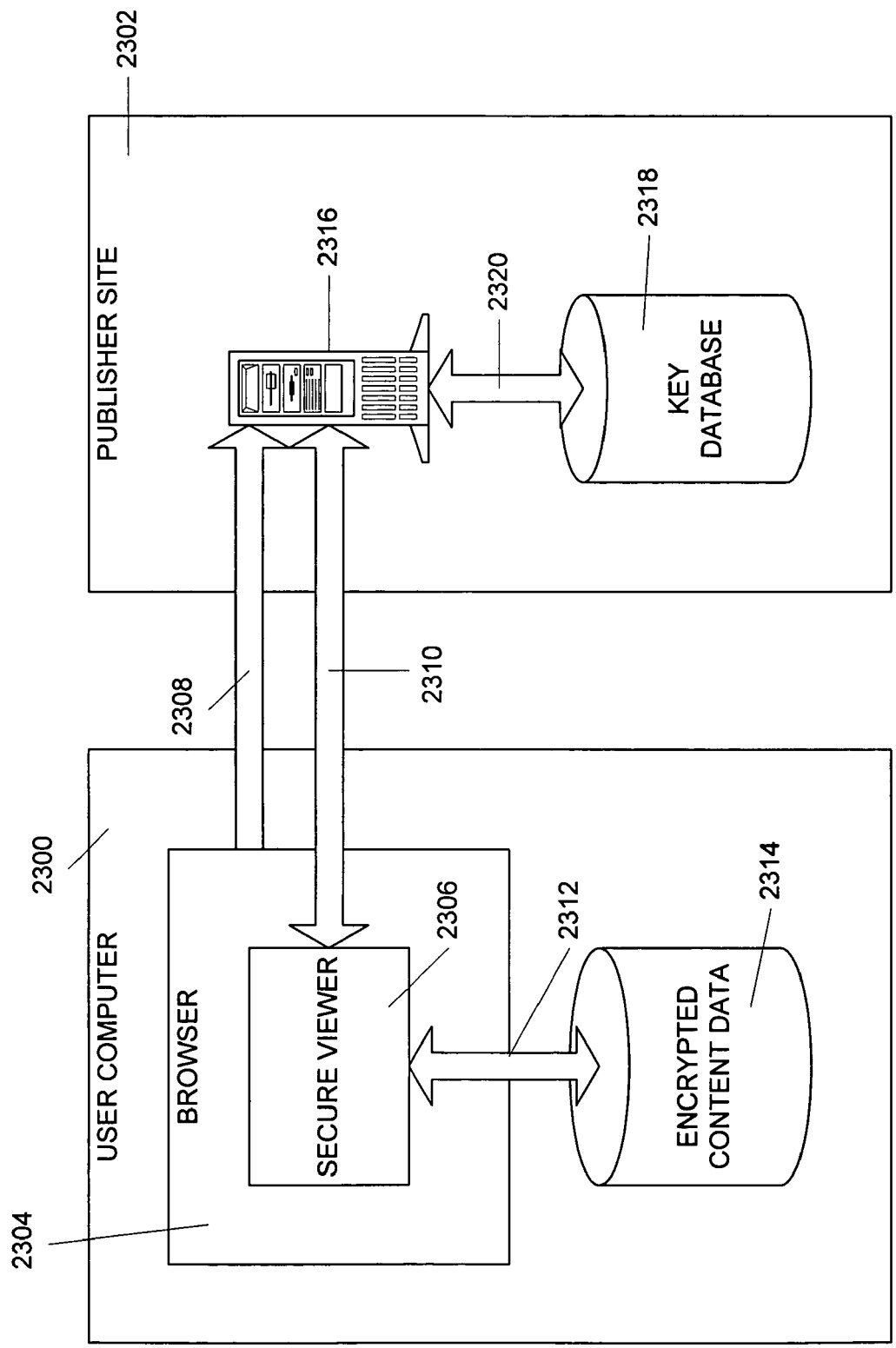
FIG. 22 is a block schematic diagram of still another embodiment in which encrypted content data is stored locally on a user's computer and is decrypted and displayed in a secure viewer using decryption keys that are downloaded from a networked server.

Still another embodiment is illustrated in FIG. 22. In this embodiment, a user can elect to store encrypted content in a database 2314 located on his or her computer 2304. For example, the content may be delivered from a publisher site 2302 by conventional means, such as CDs or DVDs. In order to view the content, the user must log in to a metrics key server 2316 located at the publisher's site 2302 or another central location using a conventional browser 2304, as indicated schematically by arrow 2308. During the login procedure, the secure content viewer software 2306 is downloaded over the network into the user's browser 2306 as indicated schematically by arrow 2310. In response to information from the user identifying a document, the content viewer 2306 reads the encrypted content from the local database 2314, and computes a document identifier from the encrypted content in a manner previously discussed. The viewer 2306 then sends the document identifier to the key server 2316 in order to retrieve decryption keys from the key database 2318. The decryption keys are then used to decrypt the encrypted content in the secure viewer software 2306.

Figure 23:
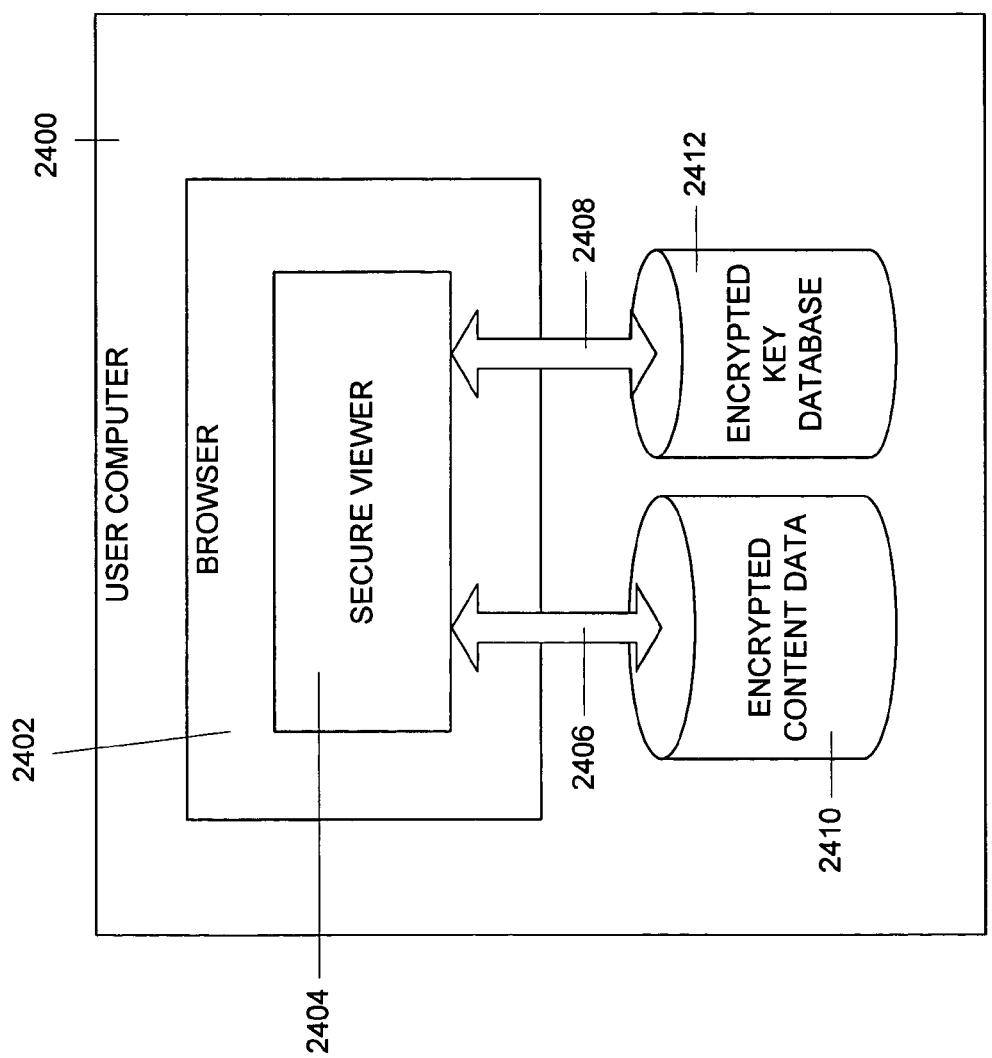
FIG. 23 is a block schematic diagram of yet another embodiment in which encrypted content data, a secure viewer and encrypted decryption keys are stored locally on a user's computer.
Figure 24:
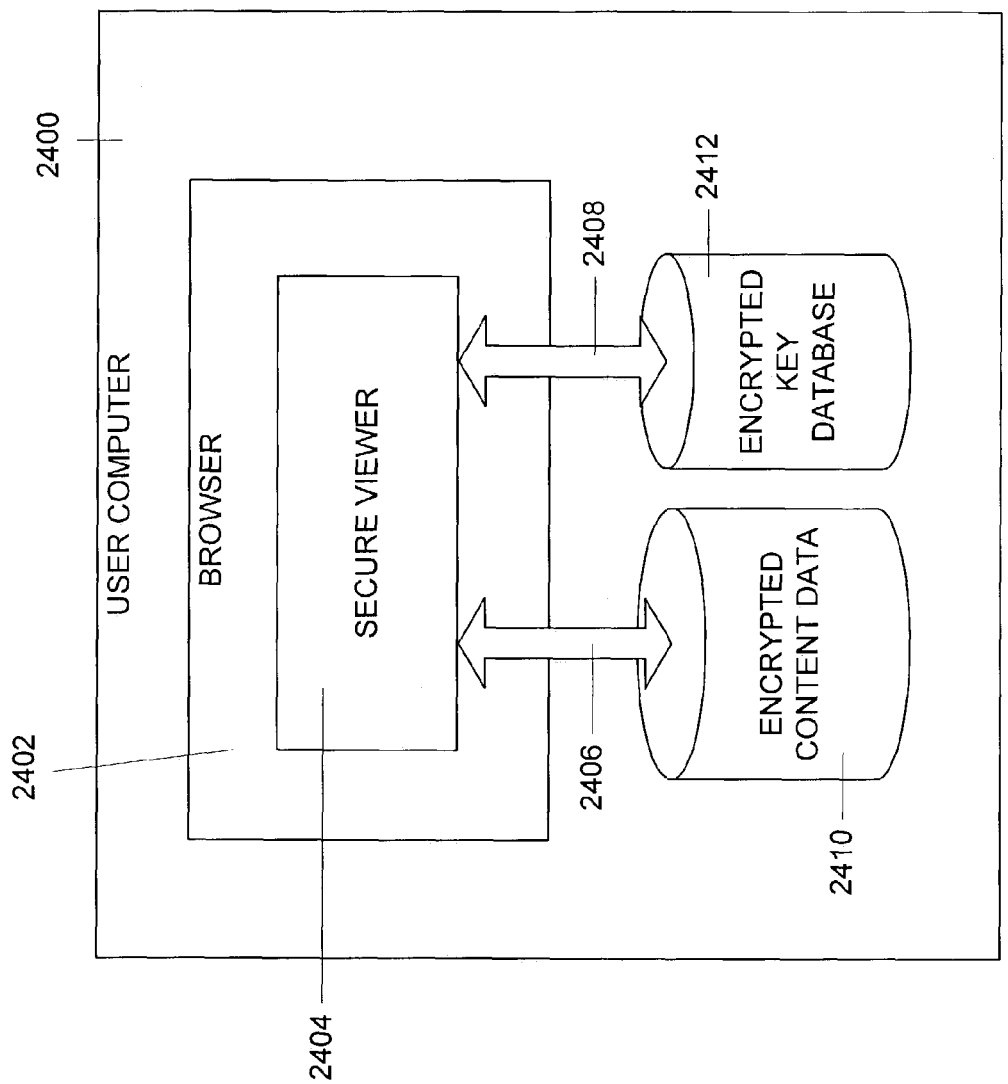

Still another embodiment is illustrated in FIG. 23 in which encrypted content data is stored in a local database 2410 on the user's computer 2400. The secure content viewer software 2404 is also stored on the user's computer 2400. Decryption keys along with document identifiers may also be stored in a key database 2412 in encrypted form on the user's computer. For example, the decryption keys may be encrypted with a key that is embedded in the viewer software 2404. Alternatively, the decryption keys may be retrieved from a networked key server (not shown in FIG. 24) as described in the previous embodiment. In response to information from the user identifying a document, the content viewer 2404 reads the encrypted content from the local database 2410, and computes a document identifier from the encrypted content in a manner previously discussed. The viewer 2404 then retrieves an encrypted decryption key from the local key database 2412. The decryption keys are then used to decrypt the encrypted content in the secure viewer software 2404.

A software implementation of the above-described embodiment may comprise a series of computer instructions either fixed on a tangible medium, such as a computer readable media, for example, a diskette, a CD-ROM, a ROM, or a fixed disk, or transmittable to a computer system via a modem or other interface device over a transmission path. The transmission path either may be tangible lines, including but not limited to, optical or analog communications lines, or may be implemented with wireless techniques, including but not limited to microwave, infrared or other transmission techniques. The transmission path may also be the Internet. The series of computer instructions embodies all or part of the functionality previously described herein with respect to the invention. Those skilled in the art will appreciate that such computer instructions can be written in a number of programming languages for use with many computer architectures or operating systems. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as a removable medium with accompanying printed or electronic documentation, e.g., shrink wrapped software, pre-loaded with a computer system, e.g., on system ROM or fixed disk, or distributed from a server or electronic bulletin board over a network, e.g., the Internet or World Wide Web.

Although an exemplary embodiment of the invention has been disclosed, it will be apparent to those skilled in the art that various changes and modifications can be made which will achieve some of the advantages of the invention without departing from the spirit and scope of the invention. For example, it will be obvious to those reasonably skilled in the art that, in other implementations, process operations different from those shown may be performed. Other aspects, such as the specific process flow and the order of the illustrated steps, as well as other modifications to the inventive concept are intended to be covered by the appended claims.

What is claimed is:

1. A method for rights management of digital content and secure delivery of digital content documents from a publisher site to an unsecure site, the method comprising:
   (a) encrypting each digital content document at the publisher site with a key to generate encrypted document content;
   (b) computing for each document, from the encrypted document content for that document, a document identifier that cannot be derived solely from the encrypted version of the requested document;
   (c) creating a list of document identifier and decryption key pairs;
   (d) assembling the encrypted document content for each content document and the list into a distribution archive;
   (e) encrypting the distribution archive with a scheduled key;
   (f) installing a content server at the unsecure site; and
   (g) sending the distribution archive from the publisher site to the content server.

2. The method of claim 1 wherein step (a) comprises compressing each document before encrypting the document.

3. The method of claim 1 wherein step (b) comprises computing a document identifier from the encrypted document content and a text string at the publisher site.

4. The method of claim 1 further comprising:
   (h) at the unsecure site, decrypting the distribution archive with the scheduled key, extracting the encrypted document content and storing the encrypted document content in a storage located at the unsecure site.

5. The method of claim 4 wherein a user at the unsecure location accesses the content server from a browser and wherein the method further comprises:
   (i) downloading a secure viewer program into the browser;

(j) using the viewer program to request a document from the content server;

(k) downloading an encrypted version of the requested document from the content server to the viewer; and (l) using the viewer to calculate a document identifier from the encrypted version of the requested document and to send the document identifier to the content server.

6. The method of claim 5 further comprising:

(m) using the document identifier in the content server to retrieve a decryption key from the list and downloading the decryption key to the viewer program; and (n) using the downloaded key in the viewer program to decrypt the encrypted version of the document and present the document to the user.

7. The method of claim 1 further comprising:

(h) monitoring content access at the unsecure site; and (i) creating a log file at the unsecure site from the monitored activities.

8. The method of claim 7 further comprising:

(j) sending the log file to the publisher site in return for a distribution archive containing new content.

9. The method of claim 8 further comprising:

(k) extracting the contents of the log file at the publisher site;

(l) formatting the extracted contents and providing a report from the formatted contents to a reporting client.

10. The method of claim 7 wherein step (h) comprises monitoring user activities including login to the system, registration, creation of a user profile and the reading and printing of selected content documents.

11. Apparatus for rights management of digital content and secure delivery of digital content documents from a publisher site to an unsecure site, the apparatus comprising:

means for encrypting each digital content document at the publisher site with a key to generate encrypted document content;

an OID calculator that computes for each document, from the encrypted document content for that document, a document identifier that cannot be derived solely from the encrypted version of the requested document;

means for creating a list of document identifier and decryption key pairs;

means for assembling the encrypted document content for each content document and the list into a distribution archive;

an encryptor that encrypts the distribution archive with a scheduled key;

means for installing a content server at the unsecure site; and means for sending the distribution archive from the publisher site to the content server.

12. The apparatus of claim 11 wherein the means for encrypting each digital content document comprises a compressor that compresses each document and an encryption engine that encrypts the compressed document.

13. The apparatus of claim 11 wherein the OID calculator comprises means for computing a document identifier from the encrypted document content and a text string at the publisher site.

14. The apparatus of claim 11 further comprising a decryption engine located at the unsecure site that decrypts the distribution archive with the scheduled key, a file decompressor that extracts the encrypted document content and stores the encrypted document content in a storage located at the unsecure site.

15. The apparatus of claim 14 wherein a user at the unsecure location accesses the content server from a browser and wherein the apparatus further comprises means for downloading a secure viewer program into the browser, means for using the viewer program to request a document from the content server; means for downloading an encrypted version of the requested document from the content server to the viewer; an OID calculator in the viewer that calculates a document identifier from the encrypted version of the requested document and means for sending the document identifier to the content server.

16. The apparatus of claim 15 further comprising means for using the document identifier in the content server to retrieve a decryption key from the list, means for downloading the decryption key to the viewer program and means for using the downloaded key in the viewer program to decrypt the encrypted version of the document and present the document to the user.

17. The apparatus of claim 11 further comprising a log server that monitors content access at the unsecure site and means for creating a log file at the unsecure site from the monitored activities.

18. The apparatus of claim 17 further comprising means for sending the log file to the publisher site in return for a distribution archive containing new content.

19. The apparatus of claim 18 further comprising a reporting server that extracts the contents of the log file at the publisher site, formats the extracted contents and provides a report from the formatted contents to a reporting client.

20. The apparatus of claim 17 wherein the log server comprises means for monitoring user activities including login to the system, registration, creation of a user profile and the reading and printing of selected content documents.

21. A computer program product for rights management of digital content and secure delivery of digital content documents from a publisher site to an unsecure site, the computer program product comprising a computer usable storage medium having computer readable program code thereon, including:

program code for encrypting each digital content document at the publisher site with a key to generate encrypted document content;

program code for computing for each document, from the encrypted document content for that document, a document identifier that cannot be derived solely from the encrypted version of the requested document;

program code for creating a list of document identifier and decryption key pairs;

program code for assembling the encrypted document content for each content document and the list into a distribution archive;

program code for encrypting the distribution archive with a scheduled key;

program code for installing a content server at the unsecure site; and program code for sending the distribution archive from the publisher site to the content server.

22. The computer program product of claim 21 wherein the program code for encrypting each digital content document at the publisher site comprises program code for compressing each document before encrypting the document.

23. The computer program product of claim 21 wherein the program code for computing a document identifier comprises program code for computing a document identifier from the encrypted document content and a text string at the publisher site.

24. The computer program product of claim 21 further comprising program code at the unsecure site, for decrypting the distribution archive with the scheduled key, extracting the encrypted document content and storing the encrypted document content in a storage located at the unsecure site.

25. The computer program product of claim 24 wherein a user at the unsecure location accesses the content server from a browser and wherein the computer program product further comprises:
  program code for downloading a secure viewer program into the browser;
  program code in the viewer program for requesting a document from the content server;
  program code for downloading an encrypted version of the requested document from the content server to the viewer; and
  program code in the viewer for calculating a document identifier from the encrypted version of the requested document and for sending the document identifier to the content server.

26. The computer program product of claim 25 further comprising:
  program code for using the document identifier in the content server to retrieve a decryption key from the list and downloading the decryption key to the viewer program; and
  program code for using the downloaded key in the viewer program to decrypt the encrypted version of the document and present the document to the user.

27. The computer program product of claim 21 further comprising:
  program code for monitoring content access at the unsecure site; and
  program code for creating a log file at the unsecure site from the monitored activities.

28. The computer program product of claim 27 further comprising:
  program code for sending the log file to the publisher site in return for a distribution archive containing new content.

29. The computer program product of claim 28 further comprising:
  program code for extracting the contents of the log file at the publisher site;
  program code for formatting the extracted contents and providing a report from the formatted contents to a reporting client.

30. The computer program product of claim 27 wherein the program code for monitoring content access comprises program code for monitoring user activities including login to the system, registration, creation of a user profile and the reading and printing of selected content documents.

* * * * *